(12) United States Patent
Kubo et al.

(10) Patent No.: US 6,771,864 B2
(45) Date of Patent: Aug. 3, 2004

(54) OPTICAL FIBER TRANSMISSION LINE, OPTICAL CABLE, AND OPTICAL TRANSMISSION SYSTEM

(75) Inventors: Yuji Kubo, Yokohama (JP); Makoto Shimizu, Yokohama (JP); Toshiyuki Miyamoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/218,516

(22) Filed: Aug. 15, 2002

(65) Prior Publication Data

US 2003/0108315 A1 Jun. 12, 2003

Related U.S. Application Data

(63) Continuation-in-part of application No. 10/078,153, filed on Feb. 20, 2002.
(60) Provisional application No. 60/336,698, filed on Dec. 7, 2001.

(30) Foreign Application Priority Data

Feb. 5, 2002 (JP) ....................................... 2002-028464
Feb. 28, 2002 (JP) ....................................... 2002-054229

(51) Int. Cl.[7] .............................................. G02B 6/02
(52) U.S. Cl. ........................ 385/123; 385/127; 359/334; 359/341.1
(58) Field of Search ................................. 385/123, 124, 385/125, 126, 127, 128; 359/334, 341, 341.1

(56) References Cited

U.S. PATENT DOCUMENTS

| | | | |
|---|---|---|---|
| 6,366,728 B1 * | 4/2002 | Way et al. .................... | 385/123 |
| 6,366,729 B1 * | 4/2002 | Brandon et al. ............. | 385/123 |
| 6,496,631 B2 * | 12/2002 | Tsukitani et al. ........... | 385/123 |
| 2003/0031440 A1 | 2/2003 | Dennis et al. | |

FOREIGN PATENT DOCUMENTS

| | | |
|---|---|---|
| JP | 10-308706 | 11/1998 |
| JP | 2001-174702 | 6/2000 |
| JP | 2001-237777 | 8/2001 |
| JP | 2001-308790 | 11/2001 |

OTHER PUBLICATIONS

J.P. Blondel, et al "Network Application and System Demonstration of WDM Systems with Very Large Spans (Error-Free 32×10 Gbit/s 750km Transmission Over 3 Amplified Spans of 250km)" 25th Anniversary of the Optical Fiber Communication Conference, Technical Digest Series, Mar. 7–10, 2000, pp. PD31–1 –PD31–3.
K. Takashima, et al "1T Bit/s (100ch 10G Bit/s) WDM Repeaterless Transmission over 200km with Raman Amplifier" OFC 2000, pp. FC8–1 –FC8–3.
T. Natio, et al, "1 Terabit/s WDM Transmission over 10, 000 km" pp. 24–25, (no date).
L. Labrunie, et al, "1.6 Terabit/s (160 ×10.66 Gbit/s) Unrepeated Transmission Over 321km Using Second Order Pumping Distributed Raman Amplification", (no date).

* cited by examiner

*Primary Examiner*—John D. Lee
*Assistant Examiner*—Jennifer Doan
(74) *Attorney, Agent, or Firm*—McDermott, Will & Emery

(57) ABSTRACT

The present invention relates to an optical fiber transmission line and the like comprising a structure for enabling repeating sections to become further longer. The optical fiber transmission line comprises first and second optical fibers successively disposed along the traveling direction of signal light, and an optical multiplexer for supplying Raman amplification pumping light to one of the first and second optical fibers. The first and second optical fibers are optically connected to each other. The second optical fiber has an effective area smaller than that of the first optical fiber, and a chromatic dispersion and a length which are different from those of the first optical fiber. In particular, the respective lengths of the first and second optical fibers are appropriately regulated so as to effectively suppress nonlinear phenomena other than Raman amplification.

31 Claims, 15 Drawing Sheets

32-CH SIGNAL LIGHT
2-CH PUMPING LIGHT

SIGNAL LIGHT → → SIGNAL LIGHT
← PUMPINGLIGHT

SIGNAL LIGHT → → SIGNAL LIGHT
← PUMPINGLIGHT

SIGNAL LIGHT → → SIGNAL LIGHT
← PUMPINGLIGHT

OPTICAL FIBER TRANSMISSION LINE, OPTICAL CABLE, AND OPTICAL TRANSMISSION SYSTEM

RELATED APPLICATION

This application claims priority of U.S. Provision Application Serial No. 60/336,698 filed Dec. 07, 2001. This is a Continuation-In-Part application of patent application Ser. No. 10/078,153 filed on Feb. 20, 2002, now U.S. Pat. No. 6,687,443.

BACKGROUND OF THE INVENTION

1. Field of the Invention

The present invention relates to an optical fiber transmission line suitable for high-speed transmission with a large capacity over a long distance, an optical cable including the same, and an optical transmission system including the same.

2. Related Background Art

Optical transmission systems transmit signal light including a large capacity of information over a long distance at a high speed by way of optical fiber transmission lines. Various proposals have been made in order to realize further larger capacity and longer distance in such an optical transmission system. For example, the optical transmission system disclosed in literature 1—J. -P. Blondel, et al., "Network Application and System Demonstration of WDM Systems with Very Large Spans", OFC'2000, PD31 (2000)—is a wavelength division multiplexing (WDM) transmission system which optically transmits a plurality of channels of signals in a wavelength division multiplexing manner, while comprising an optical fiber amplifier (EDFA: Erbium-Doped Fiber Amplifier) employing an optical fiber having an optical waveguide region doped with Er element as an optical amplifying medium, and a Raman amplifier utilizing a Raman scattering phenomenon. Also, in the optical transmission system disclosed in the above-mentioned literature 1, an optical fiber transmission line comprising an optical fiber having a low loss is laid in a repeating section. At least one of transmitting, repeating, and receiving stations is provided with an EDFA and means for supplying Raman amplification pumping light to the optical fiber transmission line. Such a configuration makes repeating sections longer in the optical transmission system disclosed in literature 1.

The optical transmission systems disclosed in literature 2—T. Naito, et al., "1 Terabit/s WDM Transmission over 10,000 km", ECOC'98, pp. 24–25 (1988)"—and literature 3—K. Takashina, et al., "1 Tbit/s (100 ch·10 Gbit/s) WDM Repeaterless Transmission over 200 km with Raman Amplifier", OFC'2000, FC8 (2000)—are also WDM transmission systems each comprising an EDFA and a Raman amplifier. In the optical transmission systems disclosed in literatures 2 and 3, the optical fiber transmission line laid in a repeating section is constituted by a positive dispersion optical fiber having a low transmission loss, a large effective area, and a positive chromatic dispersion, and a negative dispersion optical fiber, disposed downstream the positive dispersion optical fiber so as to compensate for the chromatic dispersion in the positive dispersion optical fiber, having a negative chromatic dispersion. At least one of transmitting, repeating, and receiving stations is provided with an EDFA and means for supplying Raman amplification pumping light to the negative dispersion optical fiber. Such a configuration restrains the waveform of signal light from deteriorating due to nonlinear optical phenomena and cumulative chromatic dispersion, whereby a larger capacity in optical transmissions and a longer distance in repeating sections are achieved.

SUMMARY OF THE INVENTION

The inventor studied the conventional optical transmission systems and, as a result, has found the following problems. Namely, as compared with long-distance optical transmission systems (e.g., a system connecting continents to each other with a submarine optical cable), medium-range optical transmission systems (e.g., a system connecting the mainland and an island to each other with a submarine optical cable) are required to further elongate their repeating sections. This is due to the fact that, in a medium-range optical transmission system connecting the mainland and an island to each other, a transmitting station, a repeating station, or a receiving station is provided only in the mainland or island, whereas there has been an increasing demand for making a non-repeating section between the mainland and island. However, there is a limit to elongation of repeating sections in each of the optical transmission systems disclosed in the above-mentioned literatures 1 to 3.

In the optical transmission system disclosed in the above-mentioned literature 1, the optical fiber transmission line is constituted by one kind of optical fiber alone, whereby it is preferred that the optical fiber have a high dopant concentration in its core region or a small effective area from the viewpoint of Raman amplification efficiency with respect to signal light in this optical fiber. However, when the dopant concentration is higher, transmission loss becomes greater due to Rayleigh scattering caused by the dopant. Also, when the effective area is smaller, nonlinear optical phenomena are more likely to occur, thereby deteriorating the waveform of signal light, thus failing to transmit signal light having a high power. Hence, there is a limit to elongation of repeating sections in the optical transmission system disclosed in literature 1.

In the optical transmission system disclosed in the above-mentioned literature 2 or 3, the optical fiber transmission line is constituted by a positive dispersion optical fiber and a negative dispersion optical fiber. In general, the negative dispersion optical fiber has a high dopant concentration in its core region, whereby its transmission loss is large due to the Rayleigh scattering caused by the dopant. Hence, there is a limit to elongation of repeating sections in the optical transmission systems disclosed in literatures 2 and 3 as well.

In order to overcome the problems mentioned above, it is an object of the present invention to provide an optical fiber transmission line comprising a structure which enables repeating sections to become further longer and can yield stable transmission characteristics even when pumping light having a higher power is supplied thereto, an optical cable including the same, and an optical transmission system including the same.

The optical fiber transmission line according to the present invention comprises first and second optical fibers successively disposed along a traveling direction of signal light, and an optical multiplexer for supplying Raman amplification pumping light to one of the first and second optical fibers. The first optical fiber comprises an entrance end for receiving signal light and an exit end for emitting the signal light, whereas the second optical fiber comprises an entrance end optically connected to the exit end of the first optical fiber and an exit end for emitting the signal light. Each of the first and second optical fibers may have a core region doped with a refractive index adjustor such as $GeO_2$, or at least one of the first and second optical fibers may have a core region substantially made of pure silica glass.

In particular, in this optical fiber transmission line, the first optical fiber has, as characteristics at a wavelength of 1550 nm, a first effective area $A_{eff1}$ and a first chromatic dispersion D1, and has a first length L1. The second optical fiber has, as characteristics at the wavelength of 1550 nm, a second effective area $A_{eff2}$ smaller than the first effective area $A_{eff1}$ and a second chromatic dispersion D2 different from the first chromatic dispersion D1, and has a second length L2 different from the first length L1. The optical multiplexer is optically coupled to the entrance end of the first optical fiber so as to supply the Raman amplification pumping light to the first optical fiber together with the signal light, or optically coupled to the exit end of the second optical fiber so as to supply the Raman amplification pumping light to the second optical fiber while transmitting therethrough the signal light emitted from the second optical fiber.

Here, as shown in Japanese Patent Application Laid-Open No. HEI 8-248251 (EP 0 724 171 A2), the above-mentioned effective area $A_{eff}$ is given by the following expression:

$$A_{eff} = 2\pi \left( \int_0^\infty E^2 r \, dr \right)^2 / \left( \int_0^\infty E^4 r \, dr \right)$$

where E is the electric field accompanying the propagating light, and r is the radial distance from the center of the core region.

Recently, as optical transmissions attain a larger capacity, attention has been given to distributed Raman amplification technique in which pumping light is supplied to an optical fiber transmission line, so that the optical fiber transmission line itself becomes an optical amplifying medium. Though a high nonlinearity is required for efficiently carrying out Raman amplification, it also induces nonlinear phenomena (e.g., four-wave mixing, self-phase modulation, and cross-phase modulation) other than Raman amplification, thereby causing signals to deteriorate. Such nonlinear phenomena other than Raman amplification are more likely to occur within optical fibers as the signal light power is higher.

For effectively suppressing the above-mentioned unnecessary nonlinear phenomena other than Raman amplification, it is preferred in the optical fiber transmission line that the ratio of the length of the second optical fiber (L2/(L1+L2)) to the total length of the optical fiber transmission line (L1+L2) be 0.2 or more but 0.7 or less as an appropriate length ratio between the first and second optical fibers optically connected to each other.

Preferably, in the optical fiber transmission line, each of the first chromatic dispersion D1 and second chromatic dispersion D2 (<D1) is positive and, specifically, the first chromatic dispersion D1 is greater than 17 ps/nm/km, whereas the second chromatic dispersion is greater than 3 ps/nm/km. When the Raman amplification pumping light is supplied to the second optical fiber, the second effective area $A_{eff2}$ is preferably greater than 50 $\mu m^2$, whereas the first effective area $A_{eff1}$ is preferably greater than 90 $\mu m^2$.

In an optical fiber transmission line such as the one mentioned above, it is preferred that Raman amplification pumping light be supplied to the optical fiber having the higher nonlinearity (one yielding the greater Raman gain) As the power of such Raman amplification pumping light becomes higher, signals are more likely to deteriorate due to double Rayleigh scattering and multiple reflections of signal light at the entrance end of the optical fiber on which the Raman amplification pumping light is incident. Therefore, the optical fiber transmission line according to the present invention may comprise a structure in which an optical fiber having a higher nonlinearity is held between optical fibers having a lower nonlinearity. Specifically, the optical fiber transmission line comprises first to third optical fibers successively disposed along a traveling direction of signal light, and an optical multiplexer for supplying Raman amplification pumping light to at least one of the first and third optical fibers. Each of the first to third optical fibers may have a core region doped with a refractive index adjustor such as GeO2, or at least one of the first to third optical fibers may have a core region substantially made of pure silica glass.

The first optical fiber comprises an entrance end for receiving signal light and an exit end for emitting the signal light. The first optical fiber has, as characteristics at the wavelength of 1550 nm, a first effective area $A_{eff1}$ and a first chromatic dispersion D1, and has a first length L1. The second optical fiber comprises an entrance end optically connected to the exit end of the first optical fiber and an exit end for emitting the signal light. The second optical fiber has, as characteristics at the wavelength of 1550 nm, a second effective area $A_{eff2}$ smaller than the first effective area $A_{eff1}$ and a second chromatic dispersion D2 different from the first chromatic dispersion D1, and has a second length L2 different from the first length L1. Further, the third optical fiber comprises an entrance end optically connected to the exit end of the second optical fiber and an exit end for emitting the signal light. The third optical fiber has, as characteristics at the wavelength of 1550 nm, a third effective area $A_{eff3}$ greater than the second effective area $A_{eff2}$ and a third chromatic dispersion D3 different from the second chromatic dispersion D2, and has a third length L3 different from the second length L2. The optical multiplexer is optically coupled to the entrance end of the first optical fiber so as to supply the Raman amplification pumping light to the first optical fiber together with the signal light, or optically coupled to the exit end of the third optical fiber so as to supply the Raman amplification pumping light to the third optical fiber while transmitting therethrough the signal light emitted from the third optical fiber.

Preferably, in the optical fiber transmission line having the first to third optical fibers as mentioned above, when the Raman amplification pumping light is supplied to the third optical fiber, it is preferred that the ratio of the length of the third optical fiber (L3/(L1+L2+L3)) with respect to the total length (L1+L2+L3) be 0.1 or more but 0.25 or less. The length L1 of the first optical fiber is preferably equal to or longer than the length L3 of the third optical fiber.

Preferably, in the optical fiber transmission line having the first to third optical fibers as mentioned above, each of the first to third chromatic dispersions D1 to D3 (D1>D2, D2<D3) is positive and, specifically, the second chromatic dispersion D2 is greater than 3 ps/nm/km, whereas each of the first and third chromatic dispersions D1, D3 is greater than 17 ps/nm/km. Preferably, the second effective area $A_{eff2}$ is greater than 50 $\mu m^2$. Preferably, one of the first effective area $A_{eff1}$ and third effective area $A_{eff3}$ is greater than 90 $\mu m^2$.

In the optical fiber transmission line according to the present invention comprising the structure mentioned above, all of the optical fibers constituting the optical fiber transmission line may have a core region substantially made of pure silica glass. Here, in each of the optical fibers constituting the optical fiber transmission line, the relative refractive index difference of the core region with reference to pure silica glass preferably has a maximum value of −0.1% or more but +0.1% or less.

In each of the optical fibers constituting the optical fiber transmission line, the optical fiber having the core region substantially made of pure silica glass preferably has a loss of 0.18 dB/km or less at a wavelength of 1550 nm, whereas the fusion-splicing loss between the optical fibers is preferably 0.2 dB or less.

The optical fiber transmission line according to the present invention may further comprise a structure for ameliorating a nonlinear phenomenon between channels included in the signal light reaching the entrance end of the first optical fiber. Also, it may further comprise an additional optical fiber having, as characteristics at a wavelength of 1550 nm, a negative chromatic dispersion and a polarization mode dispersion (PMD) of 0.2 ps·km$^{-1/2}$ or less, and an optical multiplexer for supplying Raman amplification pumping light to the additional optical fiber from at least one of entrance and exit ends thereof.

The optical cable according to the present invention includes the optical fiber transmission line comprising the structure mentioned above. The optical transmission system according to the present invention comprises a transmitter for transmitting a plurality of channels of signal light, the optical fiber transmission line having the structure mentioned above, and a receiver for receiving a signal propagated through the optical fiber transmission line.

BRIEF DESCRIPTION OF THE DRAWINGS

FIG. 3A is a sectional view showing the structure of an optical fiber employable in the optical fiber transmission line according to the present invention, whereas

DETAILED DESCRIPTION OF THE PREFERRED EMBODIMENTS

Figure 1:
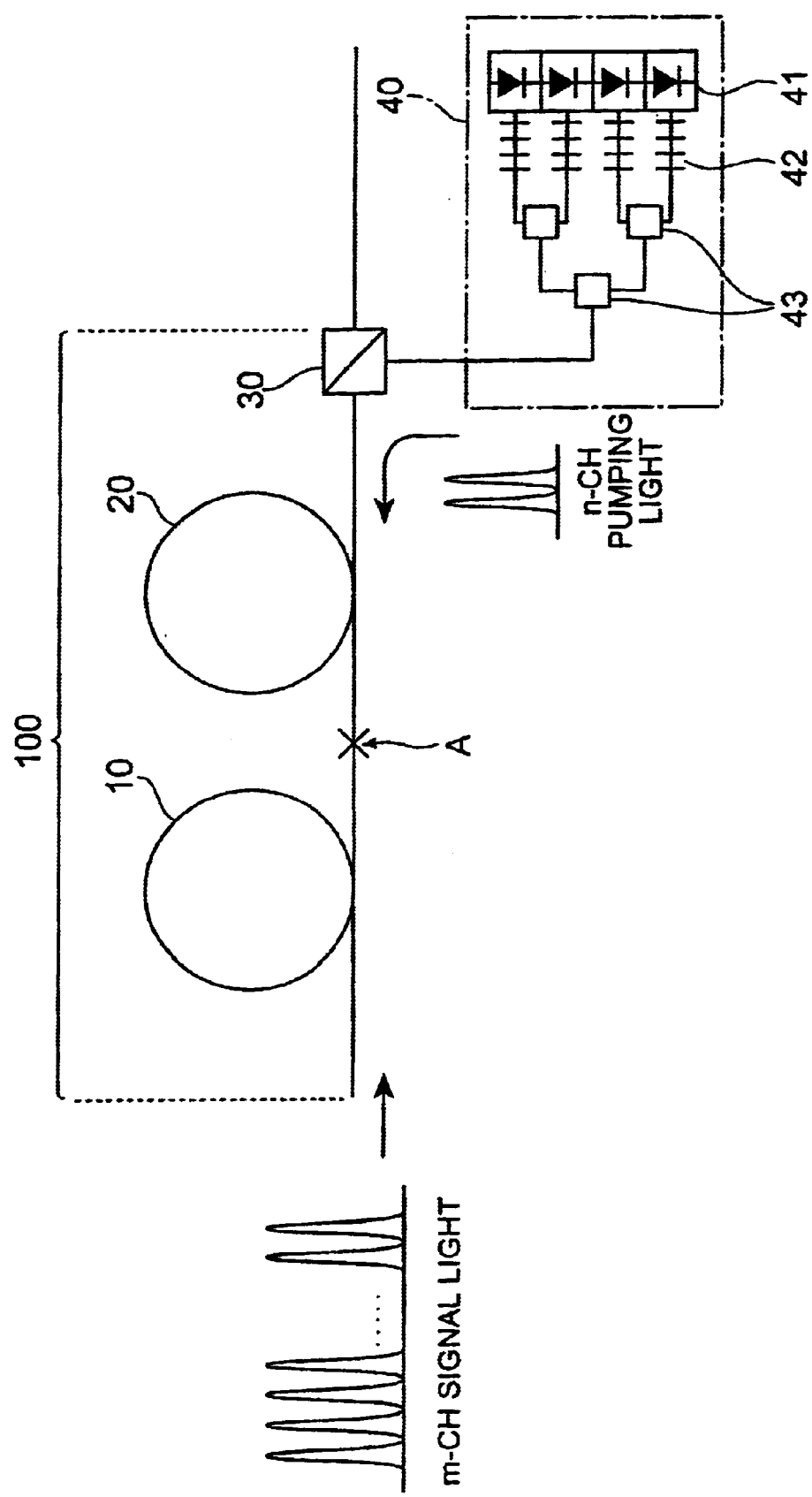
FIG. 1 is a view showing the configuration of a first embodiment in the optical transmission line according to the present invention.

Embodiments of the optical fiber transmission lines, the optical cables and the optical transmission system according to the present invention will be described in details hereinafter with reference to FIGS. 1, 2, 3A–13B, 14 and 15. The same portions and the same elements in the drawings are indicated with the same reference numbers so as to avoid redundant explanation.

FIG. 1 is a view showing the configuration of a first embodiment in the optical transmission line according to the present invention. An optical fiber transmission line 100 according to the first embodiment comprises a first optical fiber 10, a second optical fiber 20 and an optical multiplexer 30 successively disposed along a traveling direction of signal light.

The optical multiplexer 30 transmits therethrough signal light from the second optical fiber 20, and supplies Raman amplification pumping light from a pumping light source 40 to the second optical fiber 20. The pumping light source 40 comprises LDs (Laser Diodes) 41 as light sources, wavelength selecting filters 42, and multiplexers 43 for multiplexing the pumping light transmitted through the wavelength selecting filters 42 from the LDs 41 and outputting n channels of Raman amplification pumping light. The first optical fiber 10 comprises an entrance end for receiving m channels of signal light, and an exit end for emitting the signal light. The second optical fiber 20 comprises an entrance end optically connected, for example fusion-spliced, to the exit end of the first optical fiber 110 and an exit end for emitting the signal light. In FIG. 1, point A indicates the fused point between the first optical fiber 10 and second optical fiber 20.

In the optical fiber transmission line 100 according to the first embodiment, each of the first optical fiber 10 and the second optical fiber 20 may have a core portion doped with a refractive index adjustor such as GeO$_2$. Alternatively, at least one of the first optical fiber 10 and second optical fiber 20 may have a core region substantially made of pure silica glass. The first optical fiber 10 has, as characteristics at a wavelength of 1550 nm, a first effective area $A_{\textit{eff}1}$ and a first chromatic dispersion D1, and a first length L1. The second optical fiber 20 has, as characteristics at a wavelength of 1550 nm, a second effective area $A_{\mathit{eff2}}$ smaller than the first effective area $A_{\mathit{eff1}}$ and a second chromatic dispersion D2 different from the first chromatic dispersion D1, and a second length L2 different from the first length L1.

Specifically, it is preferred that the first effective area $A_{\mathit{eff1}}$ be greater than 90 $\mu\mathrm{m}^2$, and that the second effective area $A_{\mathit{eff2}}$ ($<A_{\mathit{eff1}}$) be greater than 50 $\mu\mathrm{m}^2$. Preferably, the first chromatic dispersion D1 is greater than 17 ps/nm/km, whereas the second chromatic dispersion D2 is greater than 3 ps/nm/km. When an absolute value of the second chromatic dispersion D2 is less than 3 ps/nm/km, four-wave mixing would occur easily in the second optical fiber 2.

In the first embodiment, as an appropriate length ratio between the first optical fiber 10 having a lower nonlinearity and the second optical fiber 20 having a higher nonlinearity which are spliced to each other at the fused point A as mentioned above, the ratio (L2/(L1+L2)) of the length of the second optical fiber 20 (optical fiber positioned on the pumping light entrance side) to the total length of the optical fiber transmission line 100 (L1+L2) is preferably 0.2 or more but 0.7 or less.

Figure 2:
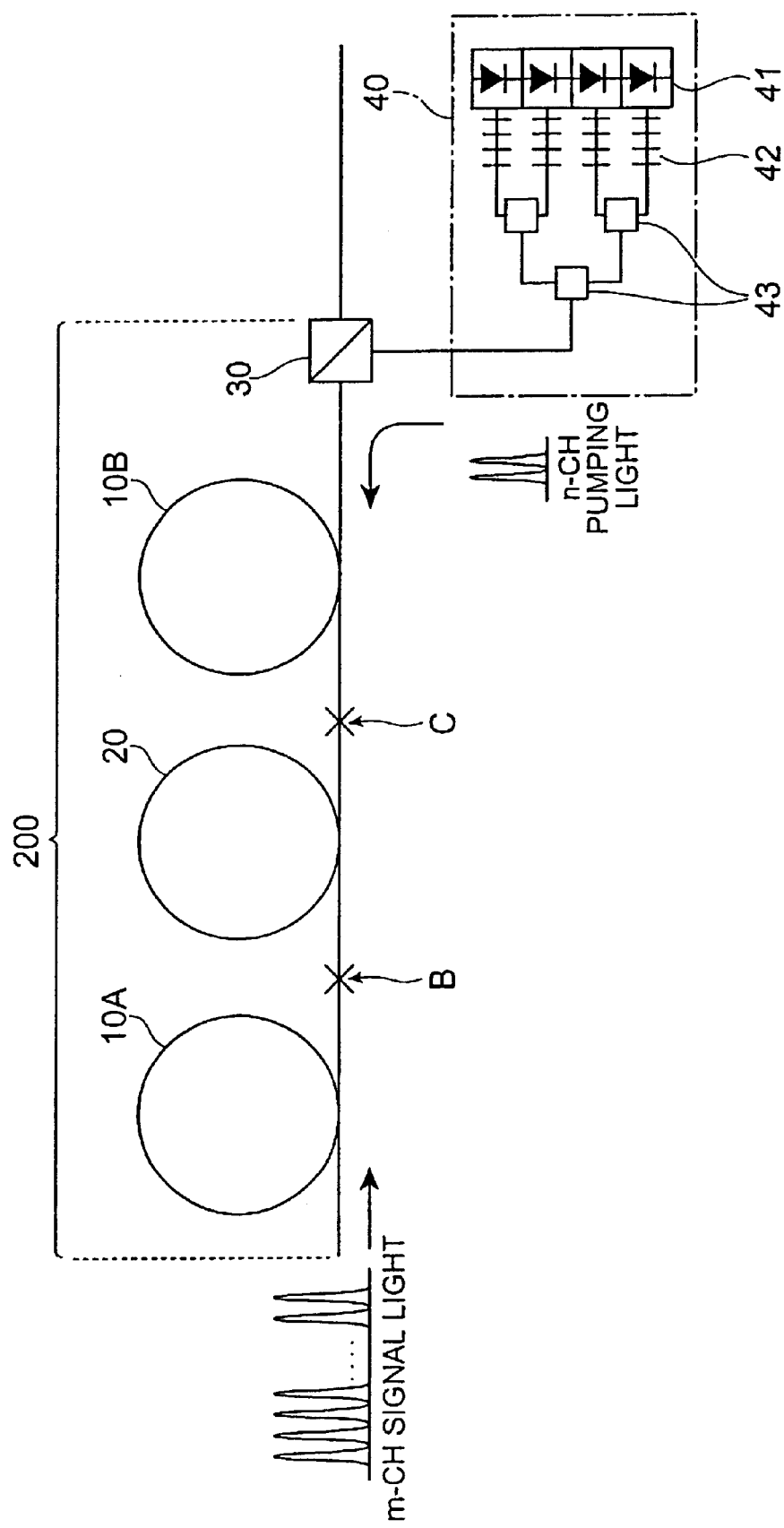
FIG. 2 is a view showing the configuration of a second embodiment in the optical transmission line according to the present invention.

Next, FIG. 2 is a view showing the configuration of a second embodiment of the optical fiber transmission line according to the present invention. The optical fiber transmission line 200 according to the second embodiment comprises a structure in which an optical fiber having a higher nonlinearity is held between optical fibers having a lower nonlinearity. Specifically, as shown in FIG. 2, the optical fiber transmission line 200 according to the second embodiment comprises a first optical fiber 10A, a second optical fiber 20, a third optical fiber 10B, and an optical multiplexer 130 successively arranged along the traveling direction of signal light. In FIG. 2, point B indicates the fused point between the first optical fiber 10A and second optical fiber 20, whereas point C indicates the fused point between the second optical fiber 20 and third optical fiber 10B. Each of the first, the second and the third optical fibers may have a core portion doped with a refractive index adjustor such as $GeO_2$, or at least one of them may have a core region substantially made of pure silica glass.

The optical multiplexer 30 transmits therethrough signal light from the second optical fiber 20, and supplies Raman amplification pumping light from a pumping light source 40 to the second optical fiber 20. The pumping light source 40 comprises LDs (Laser Diodes) 41 as light sources, wavelength selecting filters 42, and multiplexers 43 for multiplexing the pumping light transmitted through the wavelength selecting filters 42 from the LDs 41 and outputting n channels of Raman amplification pumping light. The first optical fiber 10A comprises an entrance end for receiving m channels of signal light, and an exit end for emitting the signal light. The first optical fiber 10A has, as characteristics at a wavelength of 1550 nm, a first effective area $A_{\mathit{eff1}}$ and a first chromatic dispersion D1, and a first length L1. The second optical fiber 20 comprises an entrance end optically connected, for example fusion-spliced, to the exit end of the first optical fiber 10A and an exit end for emitting the signal light. The second optical fiber 20 has, as characteristics at a wavelength of 1550 nm, a second effective area $A_{\mathit{eff2}}$ smaller than the first effective area $A_{\mathit{eff1}}$ and a second chromatic dispersion D2 different from the first chromatic dispersion D1, and a second length L2 different from the first length L1. Further, the third optical fiber 10B has an entrance end optically connected, for example fusion-spliced, to the exit end of the second optical fiber 20, and an exit end for emitting the signal light. The third optical fiber 10B has, as characteristics at a wavelength of 1550 nm, a third effective area $A_{\mathit{eff3}}$ greater than the second effective area $A_{\mathit{eff2}}$ and a third chromatic dispersion D3 different from the second chromatic dispersion D2, and a third length L3 different from the second length L2.

Preferably, in the optical fiber transmission line 200 according to the second embodiment, each of the first to third chromatic dispersions D1 to D3 (D1>D2, D2 <D3) is positive and, specifically, the second chromatic dispersion D2 is preferably greater than 3 ps/nm/km, and each of the first and third chromatic dispersions D1, D3 is preferably greater than 17 ps/nm/km. Preferably, the second effective area $A_{\mathit{eff2}}$ is greater than 50 $\mu\mathrm{m}^2$. Preferably, at least one of the first and third effective areas $A_{\mathit{eff1}}$, $A_{\mathit{eff3}}$ ($>A_{\mathit{eff2}}$) is greater than 90 $\mu\mathrm{m}^2$. When an absolute value of the second chromatic dispersion D2 is less than 3 ps/nm/km, four-wave mixing would occur easily in the second optical fiber 2.

Preferably, in the second embodiment, the ratio (L3/(L1+L2+L3)) of the length of the third optical fiber (optical fiber positioned on the pumping light entrance side) with respect to the total length (L1+L2+L3) of the optical fiber transmission line 200 is 0.1 or more but 0.25 or less.

In the optical fiber transmission lines 100, 200 according to the first and the second embodiments mentioned above, all the optical fibers constituting the optical fiber transmission lines 100, 200 may have a core region substantially made of silica glass. Preferably, such an optical fiber having a core region made of pure silica glass has, at a wavelength of 1550 nm, a loss of 0.1 dB/km or less and a polarization mode dispersion of 0.1 $\mathrm{ps\cdot km}^{-1/2}$. The fusion-splicing loss between these optical fibers is preferably 0.2 dB or less.

An optical fiber substantially made of pure silica glass which is applicable to the optical fiber transmission lines 100, 200 according to the first and the second embodiments as mentioned above has the sectional structure shown in FIG. 3A. This optical fiber 300 comprises a core region 310 with a refractive index $n_0$ (=pure silica level) extending along a predetermined axis, and a cladding region 320 with a refractive index $n_c$ covering the outer periphery of the core region 310. The core region 310 is preferably made of pure silica glass but may have a relative refractive index difference (=$(n_{max}-n_0)/n_0$) with a maximum value of –0.1% to +0.1% with reference to pure silica glass.

Figure 3A:
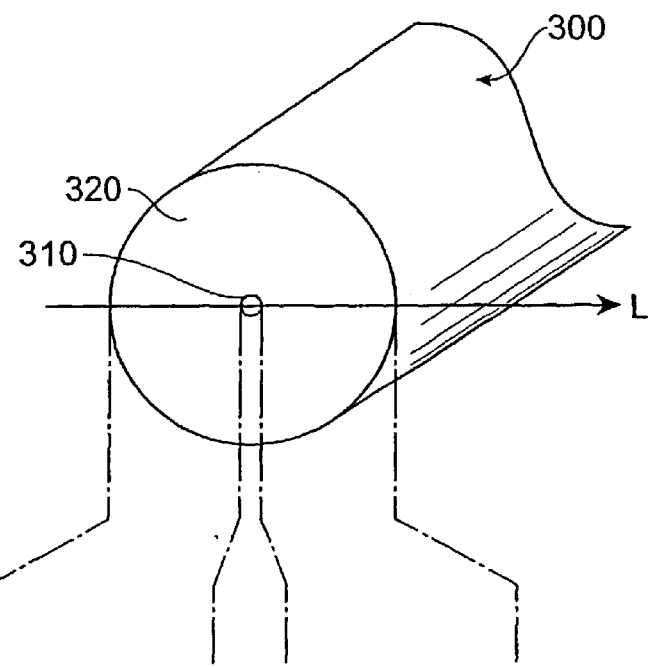
Figure 3B:
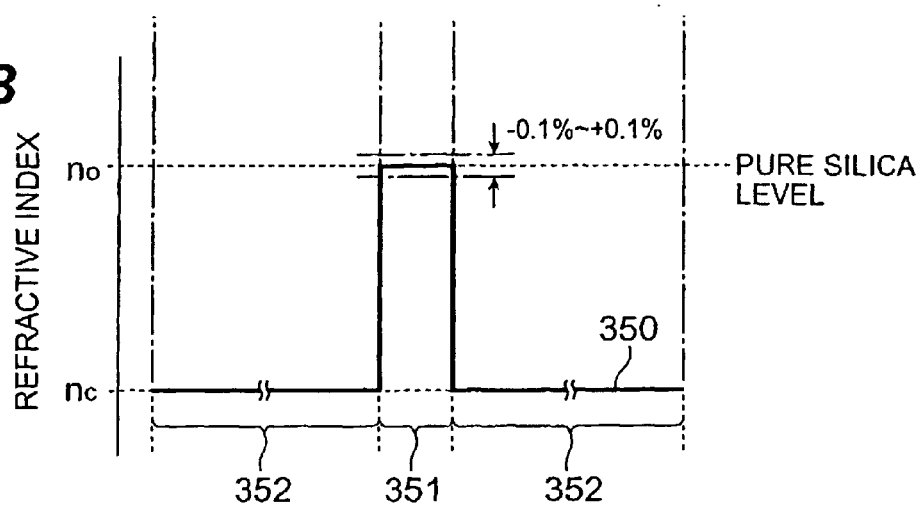
FIG. 3B is a refractive index profile thereof.

FIG. 3B shows a refractive index profile 350 of the optical fiber 300 shown in FIG. 3A, indicating the refractive index of each part on line L in FIG. 3A. In this refractive index profile 350, areas 351 and 352 represent the refractive indices of the core 310 and cladding region 320 on line L, respectively. In this specification, the maximum value of relative refractive index difference of the core region 310 with reference to pure silica glass is expressed in terms of percentage.

Simulation 1

Figure 4A:
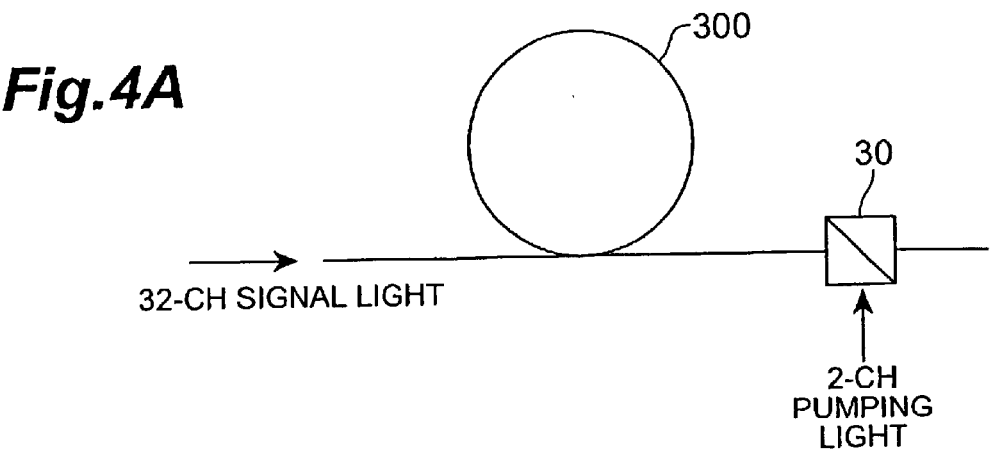
FIGS. 4A to 4D are views showing respective configurations of optical fiber transmission lines used for simulation.

Next, the inventor simulated an optimal fiber arrangement in the optical fiber transmission lines according to the present invention by changing repeating section length and Raman gain. FIG. 4A is a view showing a schematic configuration of a prepared optical fiber transmission line. Configurations of transmission lines 300 studies in practice are a transmission line constituted by a single optical fiber (FIG. 4B), a two-part transmission line (FIG. 4C) constituted by two optical fibers as in the configuration shown in FIG. 1, and a three-part transmission line (FIG. 4D) constituted by three optical fibers as in the configuration shown in FIG. 2. Prepared optical fibers are an optical fiber A having a lower nonlinearity (corresponding to the first optical fiber 10 in the first embodiment and the first and third optical fibers 10A, 10B in the second embodiment), an optical fiber B having a higher nonlinearity (corresponding to the second optical fiber 20 according to the first and the second embodiments), and a standard single-mode optical fiber (hereinafter referred to as SSMF), each having the structure shown in FIGS. 3A and 3B. The optical fiber transmission line 300 shown in FIG. 4A comprises a backward pumping type configuration so that pumping light is supplied to an optical fiber positioned downstream in the traveling direction of signal light.

The optical fiber A has a Raman gain coefficient of 0.247 (1/W/km) and, as characteristics at a wavelength of 1550 nm, a transmission loss of 0.170 dB/km, a Rayleigh scattering coefficient of $3.1 \times 10^{-8}$ (1/W), and an effective area $A_{eff}$ of 110 $\mu m^2$. The optical fiber B has a Raman gain coefficient of 0.385 (1/W/km) and, as characteristics at a wavelength of 1550 nm, a transmission loss of 0.171 dB/km, a Rayleigh scattering coefficient of $4.8 \times 10^{-8}$ (1/W), and an effective area $A_{eff}$ of 73 $\mu m^2$. The SSMF has a Raman gain coefficient of 0.367 (1/W/km) and, as characteristics at a wavelength of 1550 nm, a transmission loss of 0.187 dB/km, a Rayleigh scattering coefficient of $4.67 \times 10^{-8}$ (1/W), and an effective area $A_{eff}$ of 85 $\mu m^2$. All the prepared optical fibers A, B and C have a core region substantially made of pure silica glass.

The signal light supplied to the transmission line 300 has 32 channels ranging from 1538.5 nm to 1563.3 nm at wavelength spacing of 100 GHz (32-CH signal light). With the worst value of phase shift amount being fixed to 0.3 rad, the signal light power is adjusted as necessary so as to keep the worst value. The pumping light has two channels of 1432.5 nm and 1449.5 nm (2-CH pumping light). The pumping light power is also regulated in synchronization with power fluctuations in the signal light outputted from the transmission line 300.

Figure 4B:
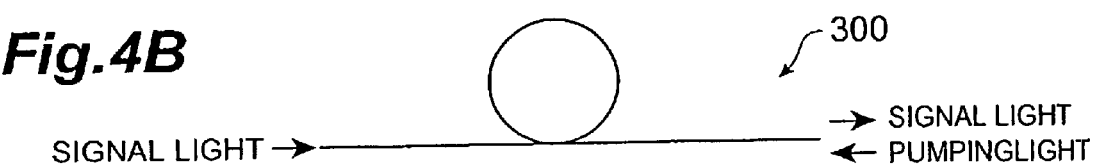
Figure 4C:
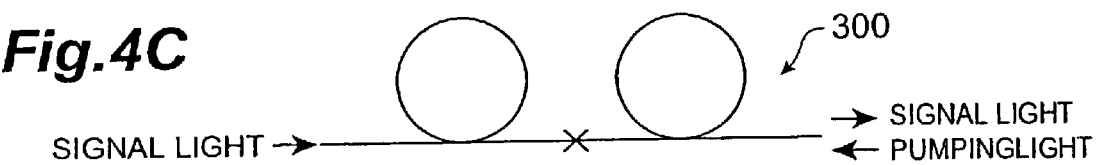
Figure 4D:
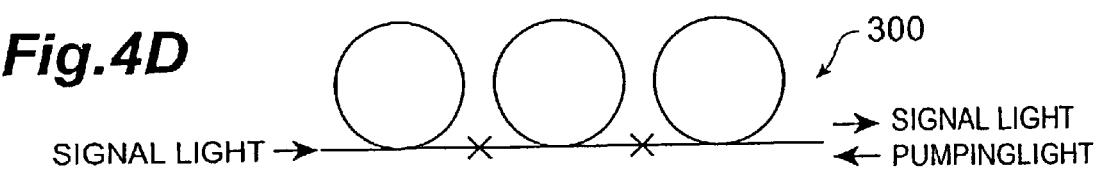

Concerning the single transmission line (FIG. 4B: SSMF), two-part transmission line (FIG. 4C: optical fiber A-optical fiber B), and three-part transmission line (FIG. 4D: optical fiber A-optical fiber B-optical fiber A), each having a total length of 250 km and a net gain of −16 dB, FIGS. 5A and 5B show relationships between the ratio (%) of length of optical fiber A in the whole transmission line 300 and the optical SN ratio (FIG. 5A) and relationships between the length ratio (%) of optical fiber A and the total pumping light power (W) (FIG. 5B).

Figure 5A:
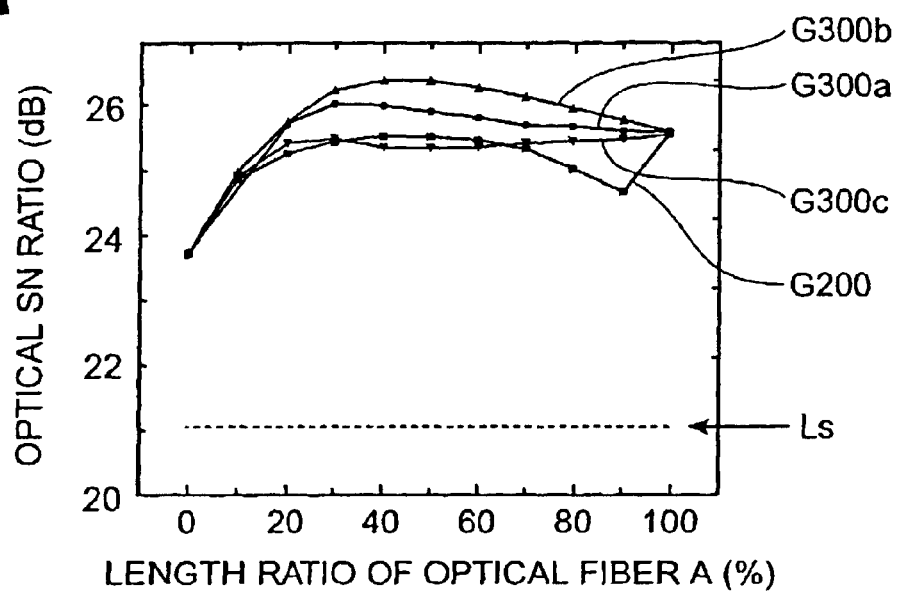
FIGS. 5A and 5B are graphs showing influences on a transmission characteristic of the whole transmission line when the length ratio of specific optical fibers is changed in each of single, two-part, and three-part transmission lines (with a total length of 250 km and a net gain of −16 dB)

In particular, in FIG. 5A, curves G200, G300a, G300b, and G300c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 5A, line Ls indicates the relationship between the length ratio (%) of optical fiber A and optical SN ratio (dB) in SSMF.

Figure 5B:
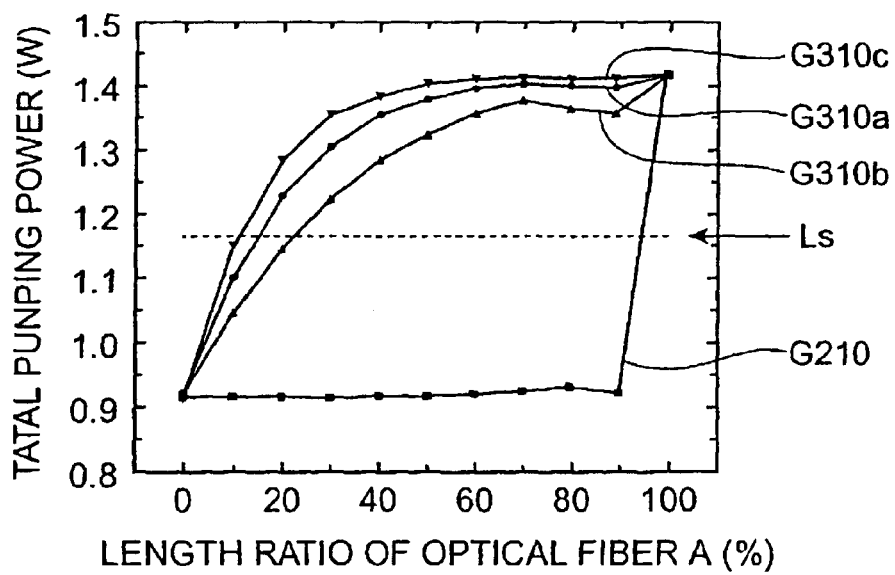

In FIG. 5B, on the other hand, curves G210, G310a, G310b, and G310c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 5B, line Ls indicates the relationship between the length ratio (%) of optical fiber A and total pumping light power (W) in SSMF.

Figure 6A:
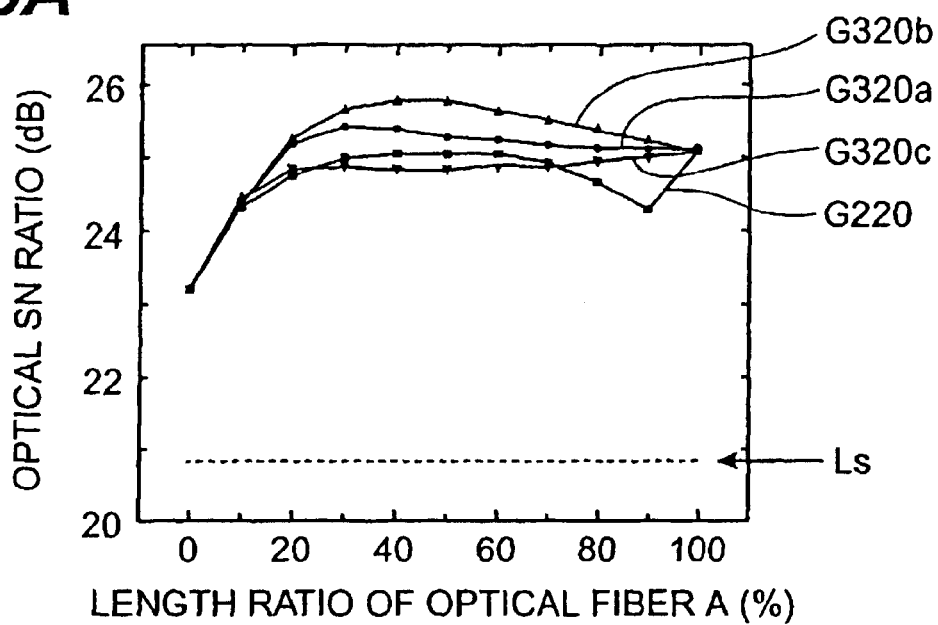
FIGS. 6A and 6B are graphs showing influences on a transmission characteristic of the whole transmission line when the length ratio of specific optical fibers is changed in each of single, two-part, and three-part transmission lines (with a total length of 250 km and a net gain of −21 dB)
Figure 6B:
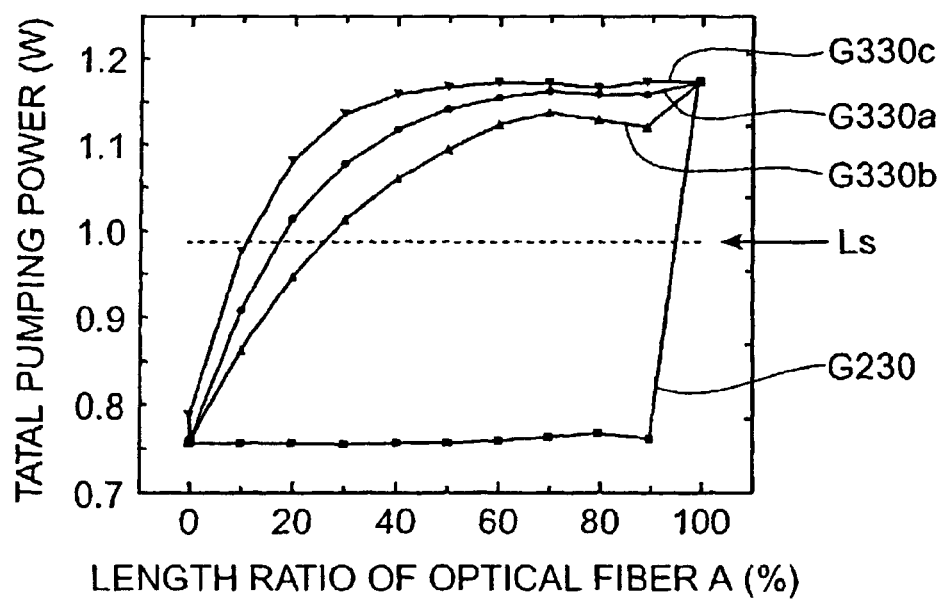

Concerning the single transmission line (FIG. 4B: any of SSMF, optical fiber A, and optical fiber B), two-part transmission line (FIG. 4C: optical fiber A-optical fiber B), and three-part transmission line (FIG. 4D: optical fiber A-optical fiber B-optical fiber A), each having a total length of 250 km and a net gain of −21 dB, FIGS. 6A and 6B show relationships between the ratio (%) of length of optical fiber A in the whole transmission line 300 and the SN ratio (FIG. 6A) and relationships between the length ratio (%) of optical fiber A and the total pumping light power (W) (FIG. 6B).

In particular, in FIG. 6A, curves G220, G320a, G320b, and G320c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 6A, line Ls indicates the relationship between the length ratio (%) of optical fiber A and optical SN ratio (dB) in SSMF.

In FIG. 6B, on the other hand, curves G230, G330a, G330b, and G330c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 6B, line Ls indicates the relationship between the length ratio (%) of optical fiber A and total pumping light power (W) in SSMF.

Figure 7A:
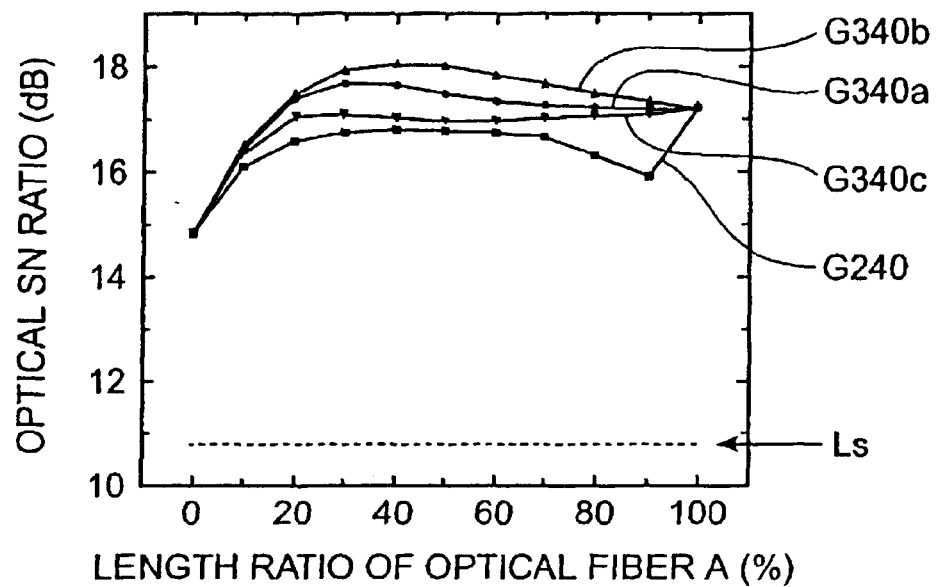
FIGS. 7A and 7B are graphs showing influences on a transmission characteristic of the whole transmission line when the length ratio of specific optical fibers is changed in each of single, two-part, and three-part transmission lines (with a total length of 300 km and a net gain of −16 dB)
Figure 7B:
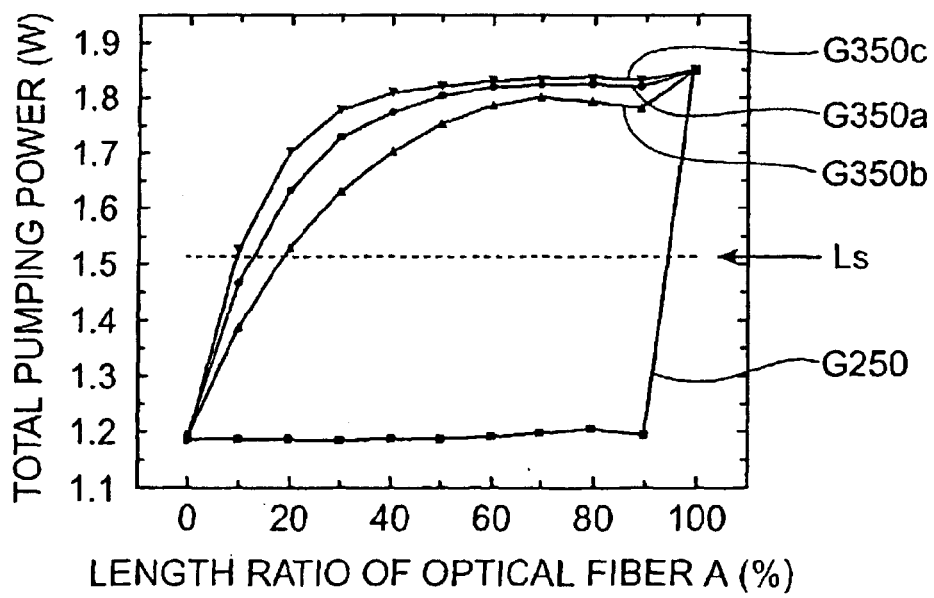

Concerning the single transmission line (FIG. 4B: any of SSMF, optical fiber A, and optical fiber B), two-part transmission line (FIG. 4C: optical fiber A-optical fiber B), and three-part transmission line (FIG. 4D: optical fiber A-optical fiber B-optical fiber A), each having a total length of 300 km and a net gain of −16 dB, FIGS. 7A and 7B show relationships between the ratio (%) of length of optical fiber A in the whole transmission line 300 and the SN ratio (FIG. 7A) and relationships between the length ratio (%) of optical fiber A and the total pumping light power (W) (FIG. 7B).

In particular, in FIG. 7A, curves G240, G340a, G340b, and G340c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 7A, line Ls indicates the relationship between the length ratio (%) of optical fiber A and optical SN ratio (dB) in SSMF.

In FIG. 7B, on the other hand, curves G250, G350a, G350b, and G350c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 7B, line Ls indicates the relationship between the length ratio (%) of optical fiber A and total pumping light power (W) in SSMF.

Figure 8A:
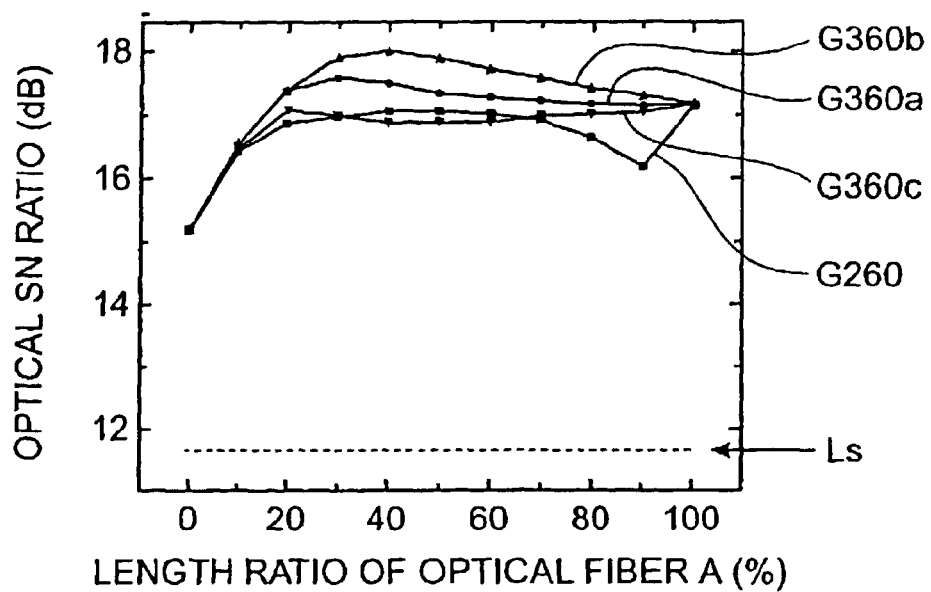
FIGS. 8A and 8B are graphs showing influences on a transmission characteristic of the whole transmission line when the length ratio of specific optical fibers is changed in each of single, two-part, and three-part transmission lines (with a total length of 300 km and a net gain of −21 dB)
Figure 8B:
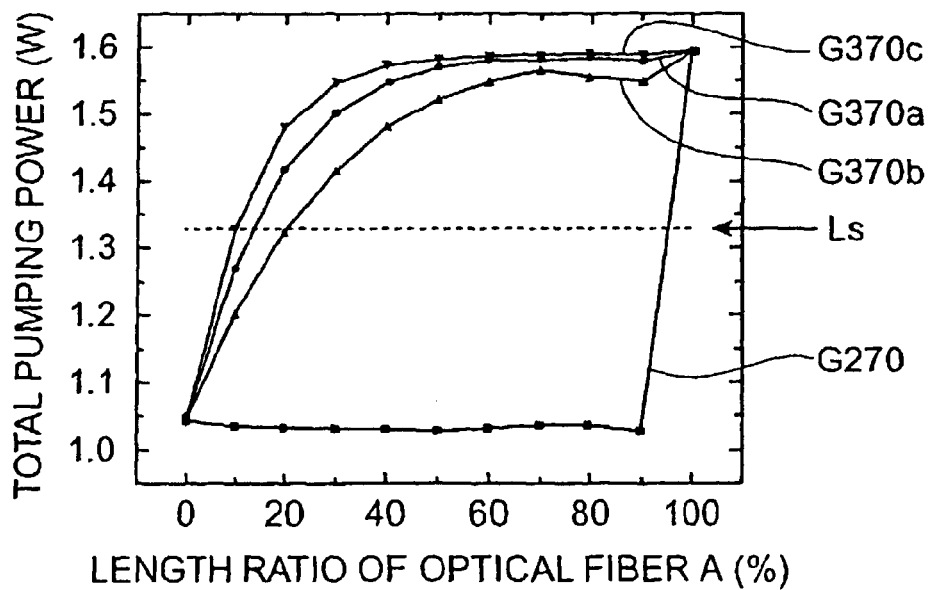

Concerning the single transmission line (FIG. 4B: any of SSMF, optical fiber A, and optical fiber B), two-part transmission line (FIG. 4C: optical fiber A-optical fiber B), and three-part transmission line (FIG. 4D: optical fiber A-optical fiber B-optical fiber A), each having a total length of 300 km and a net gain of −21 dB, FIGS. 8A and 8B show relationships between the ratio (%) of length of optical fiber A in the whole transmission line 300 and the SN ratio (FIG. 8A) and relationships between the length ratio (%) of optical fiber A and the total pumping light power (W) (FIG. 8B).

In particular, in FIG. 8A, curves G260, G360a, G360b, and G360c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 8A, line Ls indicates the relationship between the length ratio (%) of optical fiber A and optical SN ratio (dB) in SSMF.

In FIG. 8B, on the other hand, curves G270, G370a, G370b, and G370c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 8B, line Ls indicates the relationship between the length ratio (%) of optical fiber A and total pumping light power (W) in SSMF.

Simulation 2

In the above-mentioned simulation 1, the transmission lines 300 are configured with optical fibers all having a core region made of pure silica glass. However, in simulation 2, an optimal fiber arrangement in the optical fiber transmission lines 300 configured with the optical fibers having $GeO_2$-doped core regions was simulated. Configurations of the transmissions lines 300 actually investigated in the simulation 2 are a two-part transmission line (FIG. 4C) constituted by two optical fibers as in the configuration shown in FIG. 1, and a three-part transmission line (FIG. 4D) constituted by three optical fibers as in the configuration shown in FIG. 2. Prepared optical fibers are an optical fiber A having a lower nonlinearity (corresponding to the first optical fiber 10 in the first embodiment and the first and third optical fibers 10A, 10B in the second embodiment), and an optical fiber B having a higher nonlinearity (corresponding to the second optical fiber 20 according to the first and the second embodiments), each having the structure shown in FIGS. 3A and 3B. The optical fiber transmission line 300 shown in FIG. 4A comprises a counter-propagating pumping type configuration so that pumping light is supplied to an optical fiber positioned downstream in the traveling direction of signal light.

The optical fiber A is an SMF with a $GeO_2$-doped core region and an enlarged effective area $A_{eff}$, and has a Raman gain coefficient of 0.301 (1/W/km) and, as characteristics at a wavelength of 1550 nm, a transmission loss of 0.187 dB/km, an effective area $A_{eff}$ of 100 $\mu m^2$ and a chromatic dispersion of 18 ps/nm/km. The optical fiber B is an SSMF with a $GeO_2$-doped core region and has a Raman gain coefficient of 0.367 (1/W/km) and, as characteristics at a wavelength of 1550 nm, a transmission loss of 0.187 dB/km, an effective area $A_{eff}$ of 85 $\mu m^2$ and a chromatic dispersion of 16 ps/nm/km.

The signal light supplied to the transmission line 300 has 32 channels ranging from 1538.5 nm to 1563.3 nm at wavelength spacing of 100 GHz (32-CH signal light). With the worst value of phase shift amount being fixed to 0.3 rad, the signal light power is adjusted as necessary so as to keep the worst value. The pumping light has two channels of 1432.5 nm and 1449.5 nm (2-CH pumping light). The pumping light power is also regulated in synchronization with power fluctuations in the signal light outputted from the transmission line 300.

Figure 9A:
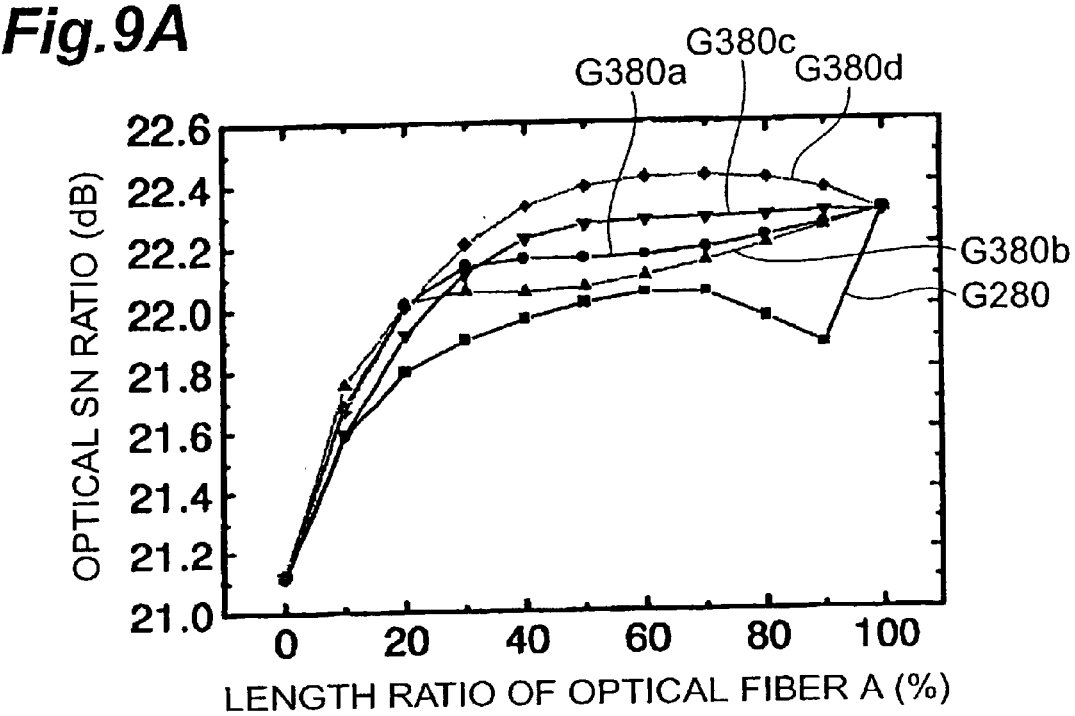
FIGS. 9A and 9B are graphs showing influences on a transmission characteristic of the whole transmission line when the length ratio of specific optical fibers is changed in each of two-part and three-part transmission lines constituted by optical fibers having a core region doped with GeO$_2$ (simulation 2)
Figure 9B:
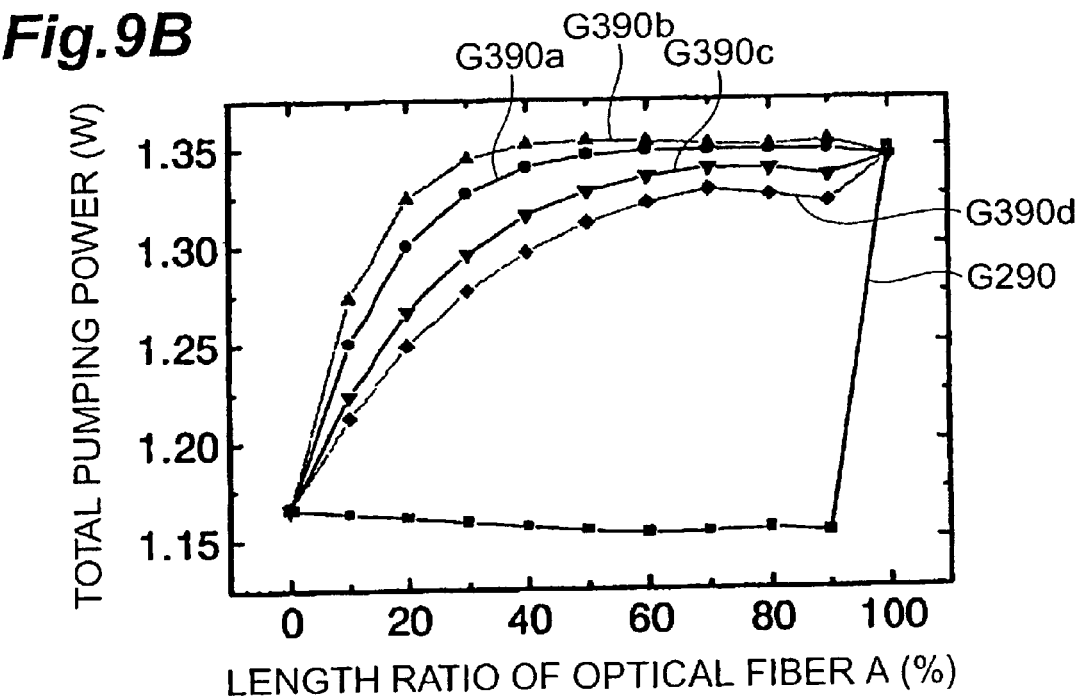

Concerning the two-part transmission line (FIG. 4C: optical fiber A-optical fiber B), and three-part transmission line (FIG. 4D: optical fiber A-optical fiber B-optical fiber A), each having a total length of 250 km and a net gain of −16 dB, FIGS. 9A and 9B show relationships between the ratio (%) of length of optical fiber A in the whole transmission line 300 and the optical SN ratio (FIG. 9A) and relationships between the length ratio (%) of optical fiber A and the total pumping light power (W) (FIG. 9B).

In particular, in FIG. 9A, curves G280, G380a, G380b, G380c and G380d show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 1:2, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 3:1.

In FIG. 9B, on the other hand, curves G290, G390a, G390b, G390c and G390d show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 1:2, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 3:1.

Simulation 3

Next, similar to the above-mentioned simulation 2, an optimal fiber arrangement in the optical fiber transmission lines 300 configured with the optical fibers having $GeO_2$-doped core regions was simulated in the simulation 3. Configurations of the transmissions lines 300 actually investigated in the simulation 3 are a two-part transmission line (FIG. 4C) constituted by two optical fibers as in the configuration shown in FIG. 1, and a three-part transmission line (FIG. 4D) constituted by three optical fibers as in the configuration shown in FIG. 2. Prepared optical fibers are an optical fiber A having a lower nonlinearity (corresponding to the first optical fiber 10 in the first embodiment and the first and third optical fibers 10A, 10B in the second embodiment), and an optical fiber B having a higher nonlinearity (corresponding to the second optical fiber 20 according to the first and the second embodiments), each having the structure shown in FIGS. 3A and 3B. The optical fiber transmission line 300 shown in FIG. 4A comprises a backward pumping type configuration so that pumping light is supplied to an optical fiber positioned downstream in the traveling direction of signal light.

The optical fiber A is an SMF with a $GeO_2$-doped core region and an enlarged effective area $A_{eff}$, and has a Raman gain coefficient of 0.301 (1/W/km) and, as characteristics at a wavelength of 1550 nm, a transmission loss of 0.187 dB/km, an effective area $A_{eff}$ of 100 $\mu m^2$ and a chromatic dispersion of 18 ps/nm/km. The optical fiber B is a non-zero dispersion shift fiber (hereinafter referred to as NZ-DSF) with a $GeO_2$-doped core region and has a Raman gain coefficient of 0.528 (1/W/km) and, as characteristics at a wavelength of 1550 nm, a transmission loss of 0.201 dB/km, an effective area $A_{eff}$ of 65 $\mu m^2$ and a chromatic dispersion of 8 ps/nm/km.

The signal light supplied to the transmission line 300 has 32 channels ranging from 1538.5 nm to 1563.3 nm at wavelength spacing of 100 GHz (32-CH signal light). With the worst value of phase shift amount being fixed to 0.3 rad, the signal light power is adjusted as necessary so as to keep the worst value. The pumping light has two channels of 1432.5 nm and 1449.5 nm (2-CH pumping light). The pumping light power is also regulated in synchronization with power fluctuations in the signal light outputted from the transmission line 300.

Figure 10A:
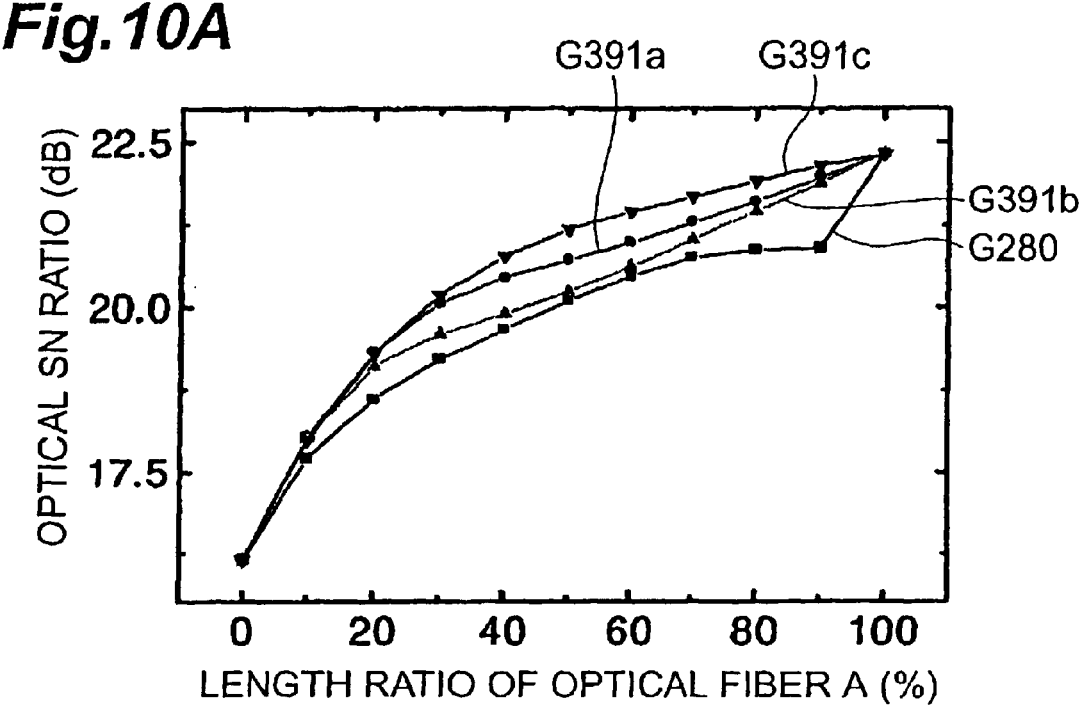
FIGS. 10A and 10B are graphs showing influences on a transmission characteristic of the whole transmission line when the length ratio of specific optical fibers is changed in each of two-part and three-part transmission lines constituted by optical fibers having a core region doped with GeO$_2$ (simulation 3)
Figure 10B:
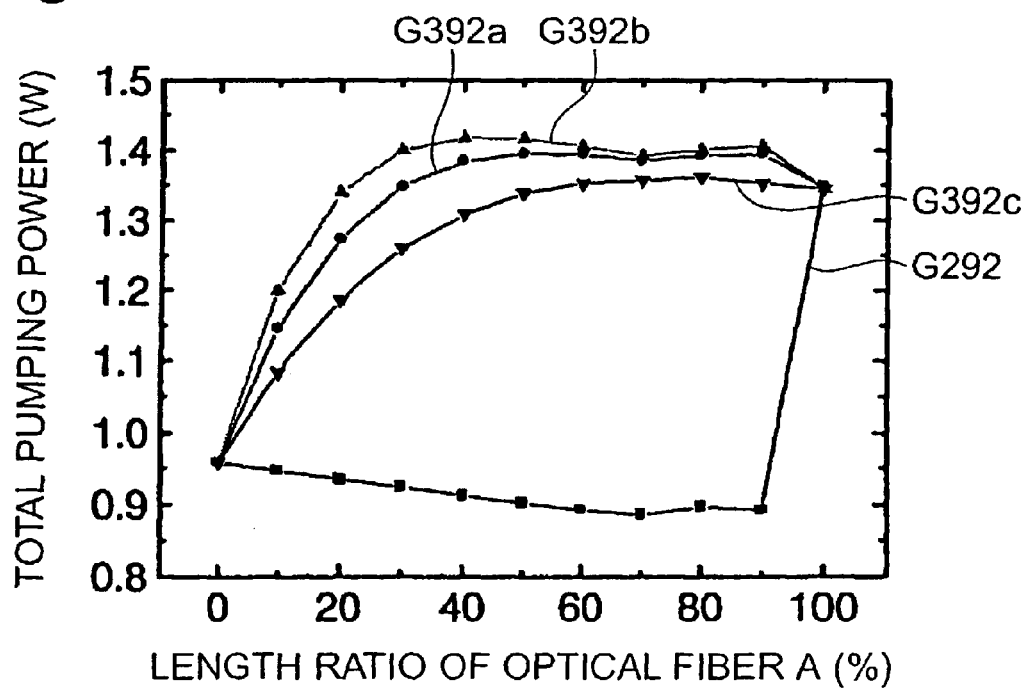

Concerning the two-part transmission line (FIG. 4C: optical fiber A-optical fiber B), and three-part transmission line (FIG. 4D: optical fiber A-optical fiber B-optical fiber A), each having a total length of 250 km and a net gain of −16 dB, FIGS. 10A and 10B show relationships between the ratio (%) of length of optical fiber A in the whole transmission line 300 and the optical SN ratio (FIG. 10A) and relationships between the length ratio (%) of optical fiber A and the total pumping light power (W) (FIG. 10B).

In particular, in FIG. 10A, curves G280, G391a, G391b and G391c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 1:2, and a three-part transmission line in which the length ratio between the optical fiber A on the signal light entrance side and the optical fiber A on the pumping light entrance side is set to 2:1.

In FIG. 10B, on the other hand, curves G292, G392a, G392b and G392c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 1:2, and a three-part transmission line in which the length ratio between the optical fiber A on the signal light entrance side and the optical fiber A on the pumping light entrance side is set to 2:1.

As revealed by the graphs of FIG. 5A to FIG. 10A, similar tendencies can be seen in each of the configurations of prepared transmission lines regardless of simulation conditions.

Particularly, in the two-part transmission line, in particular, the optical SN ratio becomes optimal as a transmission characteristic when the length ratio of optical fiber A is within the range of 30% to 80%. In other words, letting L1 be the length of the optical fiber A on the signal light entrance side and L2 be the length of the optical fiber B on the pumping light entrance side in a two-part transmission line, the length ratio (L2/(L1+L2)) of the optical fiber B with respect to the total length of transmission line (L1+L2) is preferably 0.2 or more but 0.7 or less. Also, the graphs of FIGS. 5B to 10B indicate that two-part transmission lines having a configuration in which optical fibers A and B are disposed on the signal light entrance side and pumping light entrance side, respectively, can suppress the pumping light power to a lower level even when compared with single transmission lines and the like.

On the other hand, when the optical fiber A disposed on the signal light entrance side and the optical fiber A disposed on the pumping light entrance side have a length ratio of 1:1 therebetween in a three-part transmission line, the length ratio of optical fibers A in the optimal range within which the optical SN ratio is expected to improve is 20% to 50%, in which the length ratio of the optical fiber A positioned on the pumping light entrance side with respect to the total length is 10% to 25%. When the optical fiber A disposed on the signal light entrance side and the optical fiber A disposed on the pumping light entrance side have a length ratio of 2:1 therebetween, the length ratio of optical fibers A in the optimal range within which the optical SN ratio is expected to improve is 30% to 70%, in which the length ratio of the optical fiber A positioned on the pumping light entrance side with respect to the total length is 10% to 23.3%. Further, when the optical fiber A disposed on the signal light entrance side and the optical fiber A disposed on the pumping light entrance side have a length ratio of 1:2 therebetween, the length ratio of optical fibers A in the optimal range within which the optical SN ratio is expected to improve is 20% to 30%, in which the length ratio of the optical fiber A positioned on the pumping light entrance side with respect to the total length is 13.3% to 20%. Therefore, letting L1 be the length of the optical fiber A on the signal light entrance side, L2 be the length of the optical fiber B, and L3 be the length of the optical fiber A on the pumping light entrance side in a three-part transmission line, the length ratio (L3/(L1+L2+L3)) of the optical fiber A with respect to the total length of transmission line (L1+L2+L3) is preferably 0.1 or more but 0.25 or less.

When the length ratio between the optical fiber A on the signal entrance side and the optical fiber A on the pumping light entrance side is not optimized, the optical SN ratio of the above-mentioned three-part transmission line may become inferior to that of two-part transmission lines. On the other hand, the transmission line in which the length ratio between the optical fiber A on the signal entrance side and the optical fiber A on the pumping light entrance side is set to 1:1 or 2:1 yields transmission characteristics superior to those of two-part transmission lines.

Figure 11A:
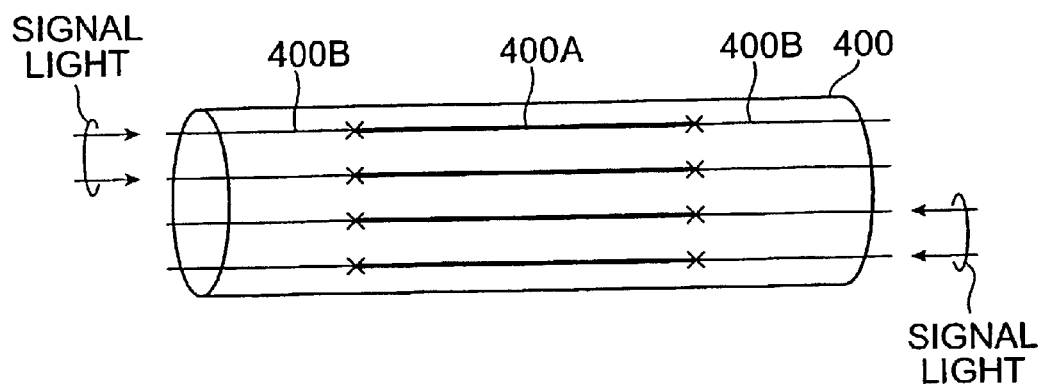
FIGS. 11A and 11B are views for explaining the optical cable according to the present invention.
Figure 11B:
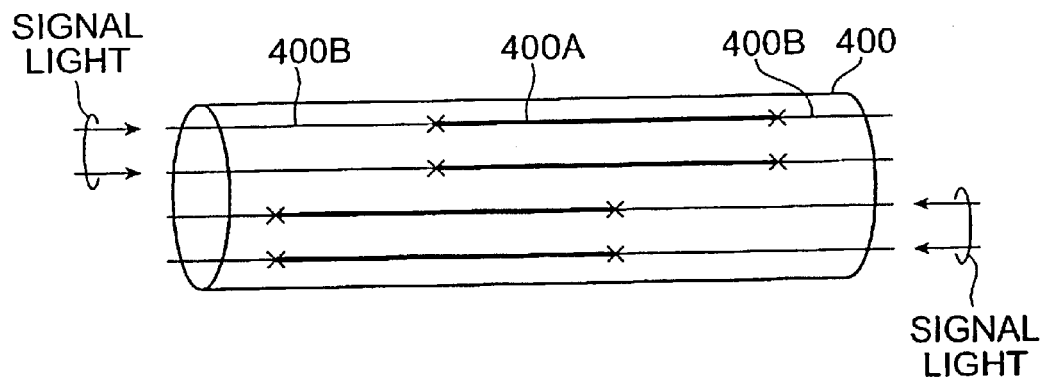

FIGS. 11A and 11B are views showing configurations of optical cables 400 according to the present invention, illustrating cable configurations employing the above-mentioned three-part transmission lines. The three-part transmission line has a configuration in which an optical fiber 400A having a higher nonlinearity corresponding to the above-mentioned optical fiber B is held between optical fibers 400B each having a lower nonlinearity corresponding to the above-mentioned optical fiber A.

In the optical cable shown in FIG. 11A, the length ratio between the optical fibers 400B positioned on both sides of the optical fiber 400A is set to 1:1, whereas the optical fibers 400B are divided 1:1 on the input and output sides of signal light. For reducing the influence of power of inputted signal light in the optical cable shown in FIG. 11B, the length ratio between the optical fibers 400B positioned on both sides of the optical fiber 400A is set to 1:1, whereas the optical fibers 400B are divided 2:1 on the input and output sides. The optical fibers on the signal light entrance side are identified by coloring beforehand in the optical cable of FIG. 11B. In the optical cables 400 shown in FIGS. 11A and 11B, the optical fibers 400B positioned on both ends of the optical fiber 400A have the same length in each of the three-part transmission lines, whereby it is advantageous in that the fiber configuration is hard to be complicated even when making a bidirectional non-repeating optical cable. When a transmission line is constituted by different kinds of optical fibers as such, the transmission loss of each optical fiber is preferably 0.18 dB/km or less at a wavelength of 1550 nm, whereas the splice loss in each fused part is preferably 0.2 dB or less. This is because of the fact that, since there are at least five fused parts including the entrance and exit ends in each of the optical cables 400 shown in FIGS. 11A and 11B, the total splice loss exceeds 1 dB unless the splice loss of each fused part is 0.2 dB or less, thereby deteriorating transmission characteristics. There are cases where conventional optical cables have a structure in which an EDF (Erbium-Doped Fiber) for optical amplification is inserted in a transmission line. By contrast, the optical cable according to the present invention is realized by a simple structure, thus being able to reduce the number of its components greatly.

Figure 12A:
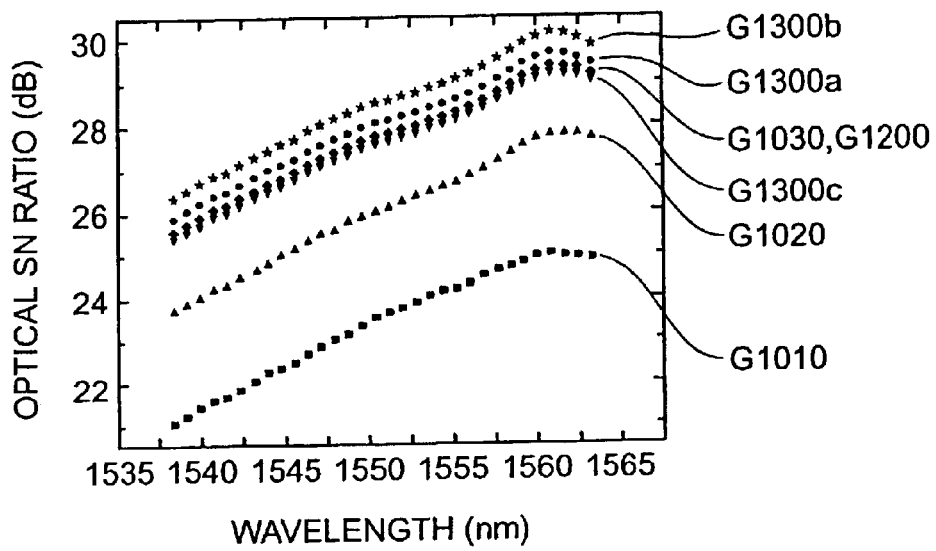
FIGS. 12A and 12B are graphs showing respective wavelength dependence characteristics of optical SN ratio and Rayleigh crosstalk concerning various optical fiber transmission lines (constituted by optical fibers having a core region substantially made of pure silica glass) having a total length of 250 km and a gain of −16 dB.
Figure 12B:
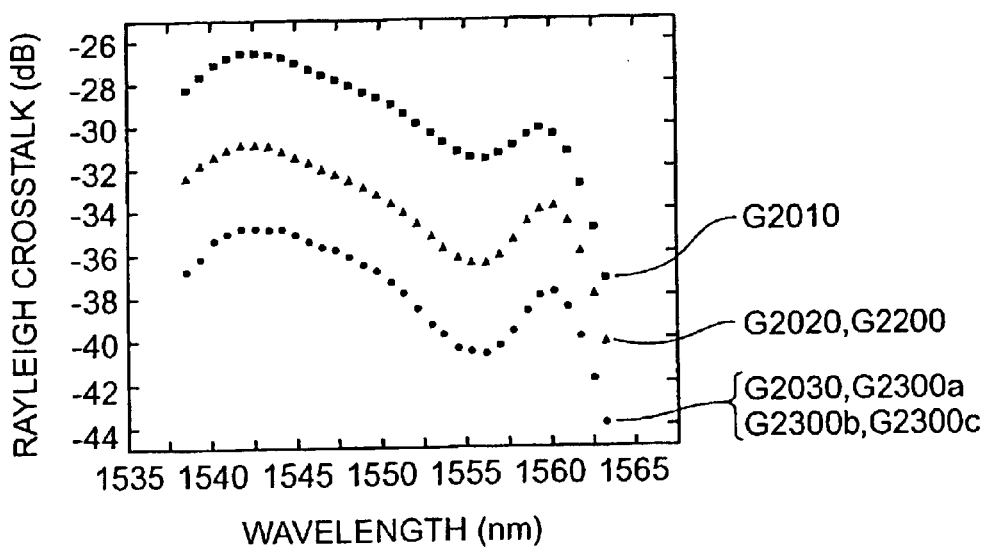

FIGS. 12A and 12B are graphs showing respective wavelength dependence characteristics of optical SN ratio and Rayleigh crosstalk (crosstalk between signal light and double Rayleigh scattering light) concerning various optical fiber transmission lines (composed of optical fibers each having a core regions substantially made of pure silica glass) each having a total length of 250 km and a gain of −16 dB. In FIG. 12A, curves G1010, G1020, G1030, G1200, G1300a, G1300b, and G1300c show respective wavelength dependence characteristics of optical SN ratio concerning an SSMF, an SMF having a core region made of pure silica glass, an SMF having a core region made of pure silica glass and an effective area greater than that of the SMF of curve G1020, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 2:1 therebetween, and a three-part transmission line in which the optical fiber on the signal entrance side and the optical fiber on the pumping light entrance side have a length ratio of 1:2 therebetween. In FIG. 12A, curves G1030, G1200, and G1300c are plotted in a substantially overlying state.

In FIG. 12B, on the other hand, curves G2010, G2020, G2030, G2200, G2300a, G2300b, and G2300c show respective wavelength dependence characteristics of Rayleigh crosstalk concerning an SSMF, an SMF having a core region made of pure silica glass, an SMF having a core region made of pure silica glass and an effective area greater than that of the SMF of curve G2020, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 2:1 therebetween, and a three-part transmission line in which the optical fiber on the signal entrance side and the optical fiber on the pumping light entrance side have a length ratio of 1:2 therebetween. In FIG. 12B, curves G2030 and G2300a to G2300c are plotted in a substantially overlying state.

Figure 13A:
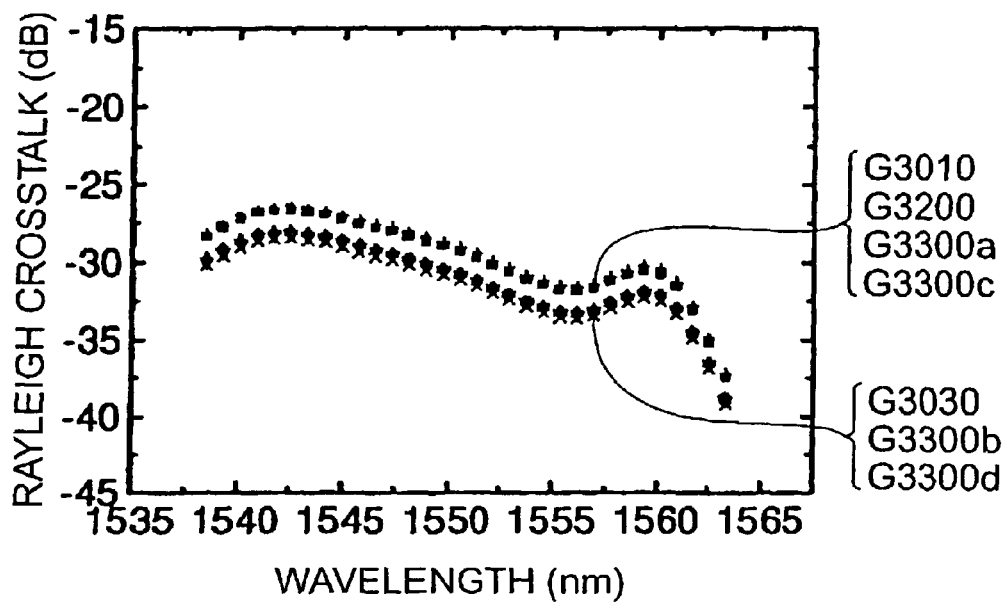
FIGS. 13A and 13B are graphs showing respective wavelength dependence characteristics of optical SN ratio and Rayleigh crosstalk concerning various optical fiber transmission lines (constituted by optical fibers having a core region doped with GeO$_2$) prepared in the simulation 2 and the simulation 3.
Figure 13B:
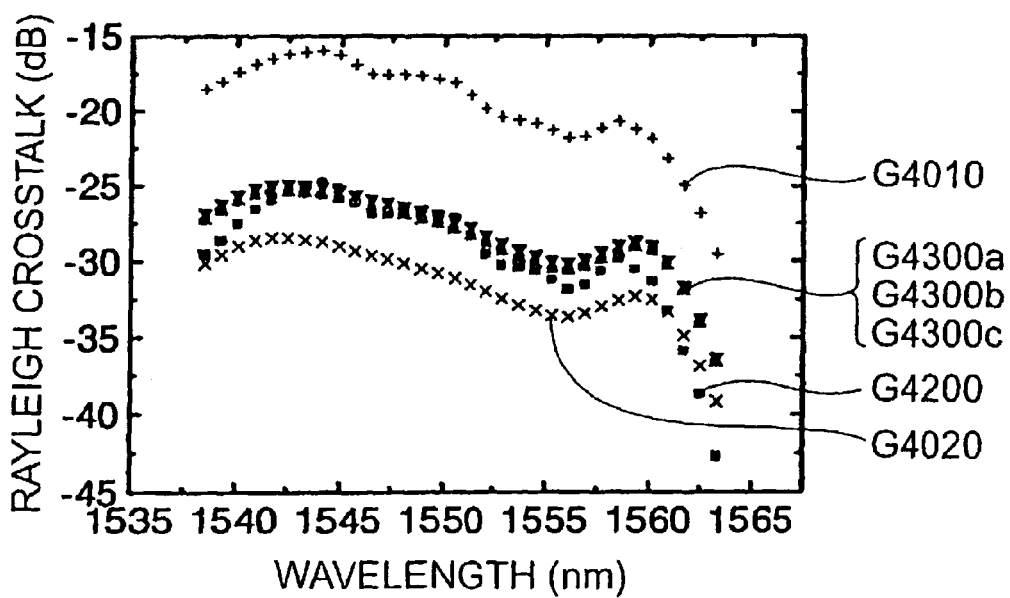

Further, FIG. 13A is a graph showing wavelength dependence characteristics of Rayleigh crosstalk (crosstalk between signal light and double Rayleigh scattering light) concerning various optical fiber transmission lines (composed of optical fibers each having a GeO$_2$-doped core region) prepared in the simulation 2. FIG. 13B is a graph showing wavelength dependence characteristics of Rayleigh crosstalk (crosstalk between signal light and double Rayleigh scattering light) concerning various optical fiber transmission lines (composed of optical fibers each having a GeO$_2$-doped core region) prepared in the simulation 3. In FIG. 13A, curves G3010, G3020, G3200, G3300a, G3300b, G3300c and G3300d show respective wavelength dependence characteristics of Layleigh crosstalk concerning an NZ-DSF, an SMF having a GeO$_2$-doped core region and an enlarged effective area A$_{eff}$, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 1:2 therebetween, a three-part transmission line in which the optical fiber on the signal entrance side and the optical fiber on the pumping light entrance side have a length ratio of 2:1 therebetween, and a three-part transmission line in which the optical fiber on the signal entrance side and the optical fiber on the pumping light entrance side have a length ratio of 3:1 therebetween. In FIG. 13A, curves G3300b and G3300d are plotted in a substantially overlying state, and curves G3010b, G3200, G3300a and G3300c are plotted in a substantially overlying state.

In FIG. 13B, curves G4010, G4020, G4200, G4300a, G4300b and G4300c show respective wavelength dependence characteristics of Rayleigh crosstalk concerning an NZ-DSF, an SMF having a GeO$_2$-doped core region and an enlarged effective area A$_{eff}$, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 1:2 therebetween, and a three-part transmission line in which the optical fiber on the pumping light entrance side have a length ratio of 2:1 therebetween. In FIG. 13B, curves G4300b to G4300C are plotted in a substantially overlying state.

As these graphs show, it can be seen that Rayleigh crosstalk is more effectively suppressed in each of the two- and three-part transmission lines than in the SMF transmission lines, and that the three-part transmission lines effectively reduce Rayleigh crosstalk in particular.

Figure 14:
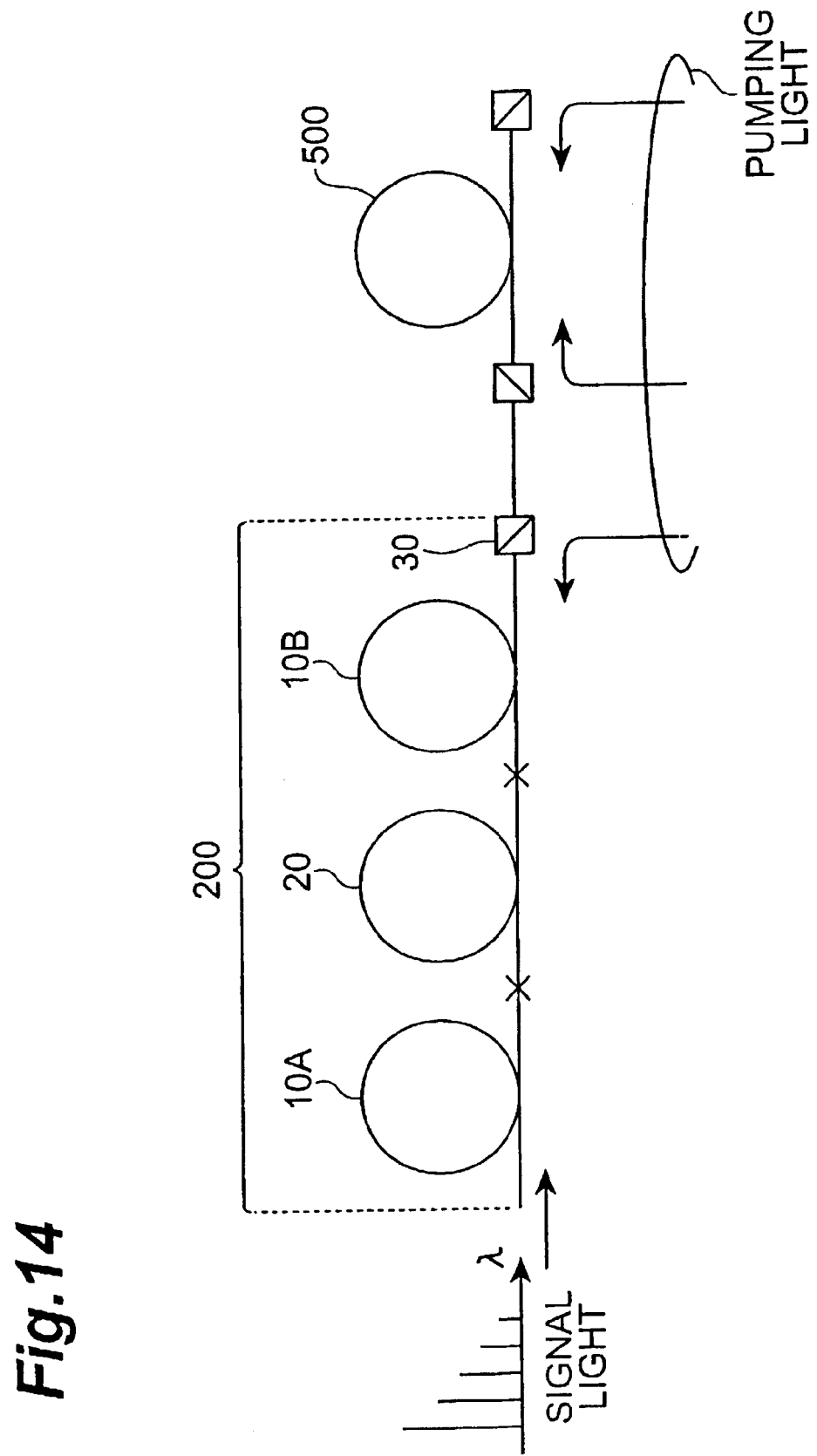
FIG. 14 is a view showing the configuration of a third embodiment in the optical fiber transmission line according to the present invention.

For ameliorating nonlinear phenomena between signal channels, the transition of optical power on the shorter wavelength side to the longer wavelength side due to Raman amplification in particular, a Raman amplification optical fiber 500 (for bidirectional pumping) having a negative chromatic dispersion may be provided downstream the three-part transmission line 200 as shown in FIG. 14 in the optical fiber transmission line according to the present invention. Such a configuration makes it possible to collectively amplify light in a wider band.

Figure 15:
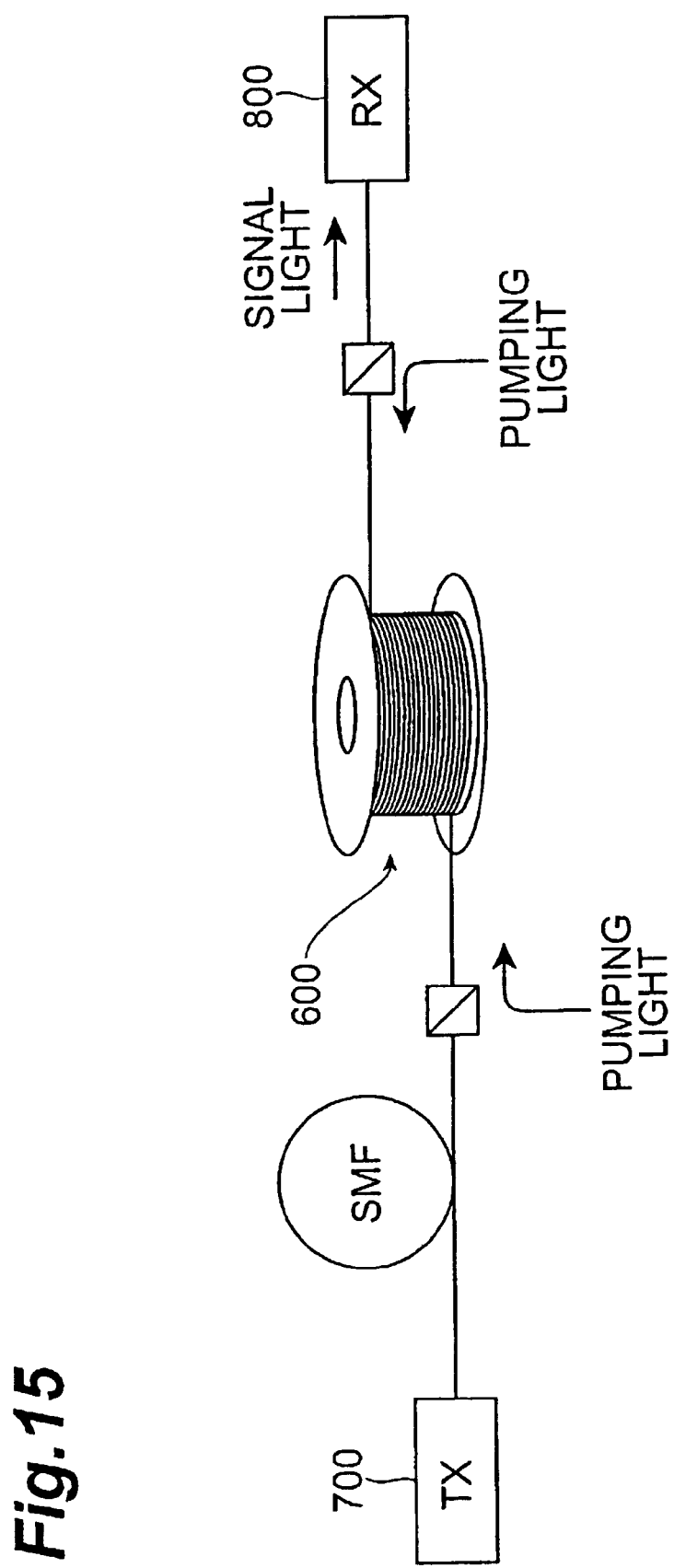
FIG. 15 is a view showing the configuration of an optical transmission system according to the present invention.

FIG. 15 is a view showing the configuration of an optical transmission system according to the present invention. This optical transmission system comprises a transmitter (TX) 700 for emitting a plurality of channels of signals and a receiver (RX) 800 for receiving the signals, whereas an optical fiber transmission line 600 having a structure such as one mentioned above is disposed therebetween. This configuration can remarkably reduce the number of components as compared with the conventional EDFA (Erbium-Doped Fiber Amplifier), while a configuration such as the one shown in FIG. 14 makes it possible to collectively amplify light in a wider band.

As in the foregoing, the present invention supplies Raman amplification pumping light to the optical fiber having the higher nonlinearity in a two-part transmission line while regulating the length ratio of optical fibers such that, for example, the length ratio of the optical fiber on the side supplied with the Raman amplification pumping light becomes about 0.2 to 0.7, thereby being effective in that desirable transmission characteristics can be obtained at a lower pumping light power.

In a three-part transmission line, on the other hand, optical fibers each having a lower nonlinearity are disposed upstream and downstream an optical fiber having a higher nonlinearity, whereas Raman amplification pumping light is supplied to at least one of the optical fibers having a lower nonlinearity, whereby it is effective in that stable transmission characteristics are obtained without deteriorating signals even when the power of supplied pumping light becomes greater.

What is claimed is:

1. An optical transmission line, comprising:
   a first optical fiber comprising an entrance end for receiving signal light and an exit end for emitting said signal light, said first optical fiber having, as characteristics at a wavelength of 1550 nm, a first effective area A$_{eff1}$ and a first chromatic dispersion D1, and having a first length L1;
   a second optical fiber comprising an entrance end optically connected to the exit end of said first optical fiber, and an exit end for emitting said signal light, said second optical fiber having, as characteristics at the wavelength of 1550 nm, a second effective area A$_{eff2}$ smaller than said first effective area A$_{eff1}$ and a second chromatic dispersion D2 different from said first chromatic dispersion D1, and having a second length L2 different from said first length L1; and
   an optical multiplexer optically coupled to the entrance end of said first optical fiber so as to supply Raman amplification pumping light to said first optical fiber together with said signal light, or optically coupled to the exit end of said second optical fiber so as to supply Raman amplification pumping light to said second optical fiber while transmitting therethrough the signal light emitted from said second optical fiber.

2. An optical fiber transmission line according to claim 1, wherein said second optical fiber has a length ratio (L2/(L1+L2)) of 0.2 or more but 0.7 or less with respect to the total length (L1+L2) of said optical fiber transmission line.

3. An optical fiber transmission line according to claim 1, wherein each of said first chromatic dispersion D1 and said second chromatic dispersion D2 is positive.

4. An optical fiber transmission line according to claim 1, wherein said second effective area A$_{eff2}$ is greater than 50 $\mu$m$^2$.

5. An optical fiber transmission line according to claim 1, wherein said first effective area A$_{eff1}$ is greater than 90 $\mu$m$^2$.

6. An optical transmission line according to claim 1, wherein at least one of said first and second optical fibers has a core region substantially made of pure silica glass.

7. An optical fiber transmission line according to claim 1, wherein the core region in each of said first and second optical fibers has a relative refractive index difference with a maximum value of −0.1% or more but +0.1% or less with reference to pure silica glass.

8. An optical fiber transmission line according to claim 1, wherein the optical fiber having a core region substantially made of pure silica glass in said first and second optical fibers has a loss of 0.18 dB/km or less at the wavelength of 1550 nm.

9. An optical fiber transmission line according to claim 1, wherein said first and second optical fibers have a fusion-splicing loss of 0.2 dB or less therebetween.

10. An optical fiber transmission line according to claim 1, further comprising a structure for ameliorating a nonlinear optical phenomenon between channels included in signal light reaching the entrance end of said first optical fiber.

11. An optical fiber transmission line according to claim 1, further comprising:
a third optical fiber having a negative chromatic dispersion as a characteristic at the wavelength of 1550 nm; and
an optical multiplexer for supplying Raman amplification pumping light to said third optical fiber from at least one of entrance and exit ends thereof.

12. An optical fiber transmission line according to claim 11, wherein said third optical fiber has a core region substantially made of pure silica glass.

13. An optical fiber transmission line according to claim 12, wherein said third optical fiber has a loss of 0.18 dB/km or less at the wavelength of 1550 nm.

14. An optical cable including the optical fiber transmission line according to claim 1.

15. An optical transmission system, comprising:
a transmitter for transmitting a plurality of channels of signal light;
an optical fiber transmission line according to claim 1; and
a receiver for receiving a signal propagated through said optical fiber transmission line.

16. An optical transmission system comprising:
a transmitter for transmitting a plurality of channels of signal light;
the optical fiber transmission line according to claim 15; and
a receiver for receiving a signal propagated through said optical fiber transmission line.

17. An optical transmission line, comprising:
a first optical fiber comprising an entrance end for receiving signal light and an exit end for emitting said signal light, said first optical fiber having, as characteristics at a wavelength of 1550 nm, a first effective area $A_{\it{eff1}}$ and a first chromatic dispersion D1, and having a first length L1;
a second optical fiber comprising an entrance end optically connected to the exit end of said first optical fiber, and an exit end for emitting said signal light, said second optical fiber having, as characteristics at the wavelength of 1550 nm, a second effective area $A_{\it{eff2}}$ smaller than said first effective area $A_{\it{eff1}}$ and a second chromatic dispersion D2 different from said first chromatic dispersion D1, and having a second length L2 different from said first length L1;
a third optical fiber comprising an entrance end optically connected to the exit end of said second optical fiber, and an exit end for emitting said signal light, said third optical fiber having, as characteristics at the wavelength of 1550 nm, a third effective area $A_{\it{eff3}}$ greater than said second effective area $A_{\it{eff2}}$ and a third chromatic dispersion D3 different from said second chromatic dispersion D2, and having a third length L3 different from said second length L2; and
an optical multiplexer optically coupled to the entrance end of said first optical fiber so as to supply Raman amplification pumping light to said first optical fiber together with said signal light, or optically coupled to the exit end of said third optical fiber so as to supply Raman amplification pumping light to said third optical fiber while transmitting therethrough the signal light emitted from said third optical fiber.

18. An optical fiber transmission line according to claim 17, wherein said third optical fiber has a length ratio (L3/(L1+L2+L3)) of 0.1 or more but 0.25 or less with respect to the total length (L1+L2+L3) of said optical fiber transmission line.

19. An optical fiber transmission line according to claim 17, wherein the length L1 of said first optical fiber is equal to or greater than the length L3 of said third optical fiber.

20. An optical fiber transmission line according to claim 17, wherein each of said first to third chromatic dispersions D1 to D3 is positive.

21. An optical fiber transmission line according to claim 17, wherein said second effective area $A_{\it{eff2}}$ is greater than 50 $\mu m^2$.

22. An optical fiber transmission line according to claim 17, wherein at least one of said first effective area $A_{\it{eff1}}$ and said third effective area $A_{\it{eff3}}$ is greater than 90 $\mu m^2$.

23. An optical transmission line according to claim 17, wherein at least one of said first to third optical fibers has a core region substantially made of pure silica glass.

24. An optical fiber transmission line according to claim 17, wherein the core region in each of said first to third optical fibers has a relative refractive index difference with a maximum value of −0.1% or more but +0.1% or less with reference to pure silica glass.

25. An optical fiber transmission line according to claim 17, wherein the optical fiber having a core region substantially made of pure silica glass in said first to third optical fibers has a loss of 0.18 dB/km or less at the wavelength of 1550 nm.

26. An optical fiber transmission line according to claim 17, wherein each of the fusion-splicing loss between said first and second optical fibers, and the fusion-splicing loss between said second and third optical fibers is 0.2 dB or less.

27. An optical fiber transmission line according to claim 17, further comprising a structure for ameliorating a nonlinear optical phenomenon between channels included in signal light reaching the entrance end of said first optical fiber.

28. An optical fiber transmission line according to claim 17, further comprising:
a fourth optical fiber having a negative chromatic dispersion as a characteristic at the wavelength of 1550 nm; and
an optical multiplexer for supplying Raman amplification pumping light to said fourth optical fiber from at least one of entrance and exit ends thereof.

29. An optical fiber transmission line according to claim 28, wherein said fourth optical fiber has a core region substantially made of pure silica glass.

30. An optical fiber transmission line according to claim 17, wherein said fourth optical fiber has a loss of 0.18 dB/km or less at the wavelength of 1550 nm.

31. An optical cable including the optical fiber transmission line according to claim 17.

* * * * *